US012632119B2

(12) United States Patent
Ding et al.

(10) Patent No.: US 12,632,119 B2
(45) Date of Patent: May 19, 2026

(54) GESTURE RECOGNITION METHOD AND RELATED APPARATUS

(71) Applicant: HUAWEI TECHNOLOGIES CO., LTD., Shenzhen (CN)

(72) Inventors: Genming Ding, Beijing (CN); Yanong He, Beijing (CN); Danni Kuang, Shenzhen (CN); Jingwei Qu, Xi'an (CN); Feng Liu, Shenzhen (CN); Jiachen Yang, Shenzhen (CN); Erli Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 629 days.

(21) Appl. No.: 17/976,629

(22) Filed: Oct. 28, 2022

(65) Prior Publication Data

US 2023/0067322 A1     Mar. 2, 2023

Related U.S. Application Data

(63) Continuation of application No. PCT/CN2021/088850, filed on Apr. 22, 2021.

(30) Foreign Application Priority Data

Apr. 30, 2020     (CN) .......................... 202010368240.2

(51) Int. Cl.
G06F 3/01          (2006.01)
G01S 13/89         (2006.01)

(52) U.S. Cl.
CPC .............. G06F 3/017 (2013.01); G01S 13/89 (2013.01)

(58) Field of Classification Search
CPC ...................................................... G06F 3/017
See application file for complete search history.

(56) References Cited

U.S. PATENT DOCUMENTS

| | | | |
|---|---|---|---|
| 9,633,483 B1 | 4/2017 | Xu et al. | |
| 2007/0247612 A1* | 10/2007 | Pack ....................... | G01S 17/86 356/337 |

(Continued)

FOREIGN PATENT DOCUMENTS

| | | |
|---|---|---|
| CN | 103455144 A | 12/2013 |
| CN | 104317391 A | 1/2015 |

(Continued)

OTHER PUBLICATIONS

Mandic, Danilo P. et al., "Recurrent Neural Networks for Prediction: Learning Algorithms, Architectures and Stability," 1st Edition, John Wiley & Sons, Inc., p. 1 and Preface. Printed Aug. 6, 2001. (Year: 2001).*

(Continued)

*Primary Examiner* — Andrew Schechter
*Assistant Examiner* — Ethan Wesley Edwards
(74) *Attorney, Agent, or Firm* — Leydig, Voit & Mayer, Ltd.

(57)          ABSTRACT

A gesture recognition method and a related apparatus are provided, to obtain a first point cloud data set by filtering an original point cloud data set collected by a radar apparatus. The first point cloud data set includes a plurality of frames of first point cloud subsets, the first point cloud subset includes a first cluster center, the first cluster center is a cluster center of a plurality of pieces of point cloud data in the first point cloud subset, a maximum horizontal distance between any two first cluster centers meets a first preset condition, and duration of the first point cloud data set meets the first preset condition. Point cloud data whose motion track does not match gesture motion can be effectively filtered out. Gesture recognition is performed by using the first point cloud data set obtained by filtering.

20 Claims, 15 Drawing Sheets

(56) References Cited

U.S. PATENT DOCUMENTS

| | | | |
|---|---|---|---|
| 2012/0309532 A1* | 12/2012 | Ambrus | G06T 11/20 |
| | | | 463/36 |
| 2014/0007022 A1 | 1/2014 | Tocino Diaz et al. | |
| 2019/0156507 A1 | 5/2019 | Zeng | |
| 2019/0278983 A1 | 9/2019 | Iqbal et al. | |
| 2019/0392205 A1 | 12/2019 | Tang et al. | |
| 2020/0012350 A1* | 1/2020 | Tay | G06N 5/01 |
| 2020/0275050 A1* | 8/2020 | Pytlarz | H04N 19/117 |
| 2021/0085294 A1* | 3/2021 | Salles | A61B 8/466 |

FOREIGN PATENT DOCUMENTS

| | | | |
|---|---|---|---|
| CN | 104503275 A | 4/2015 | |
| CN | 107301656 A | 10/2017 | |
| CN | 108501954 A | 9/2018 | |
| CN | 109164915 A | 1/2019 | |
| CN | 109829509 A | 5/2019 | |
| CN | 110007764 A | 7/2019 | |
| CN | 110032270 A | 7/2019 | |
| CN | 110309240 A | 10/2019 | |
| CN | 110347243 A | 10/2019 | |
| CN | 107742102 B | 3/2020 | |
| CN | 110895684 A | 3/2020 | |
| CN | 111695420 A | 9/2020 | |
| WO | 2016176574 A1 | 11/2016 | |
| WO | 2019091867 A1 | 5/2019 | |

OTHER PUBLICATIONS

Choi et al., "Short-Range Radar Based Real-Time Hand Gesture Recognition Using LSTM Encoder," IEEE Access, vol. 7, pp. 33610-33618, Institute of Electrical and Electronics Engineers, New York, New York (Received Feb. 1, 2019, accepted Feb. 24, 2019, date of publication Mar. 7, 2019, date of current version Mar. 29, 2019).

* cited by examiner (3)                              (4)                              (5)

Range-FFT                  Range-Doppler              Original point
                                                       cloud data set (6)                              (7)

Clustering (clustering)        Target tracking

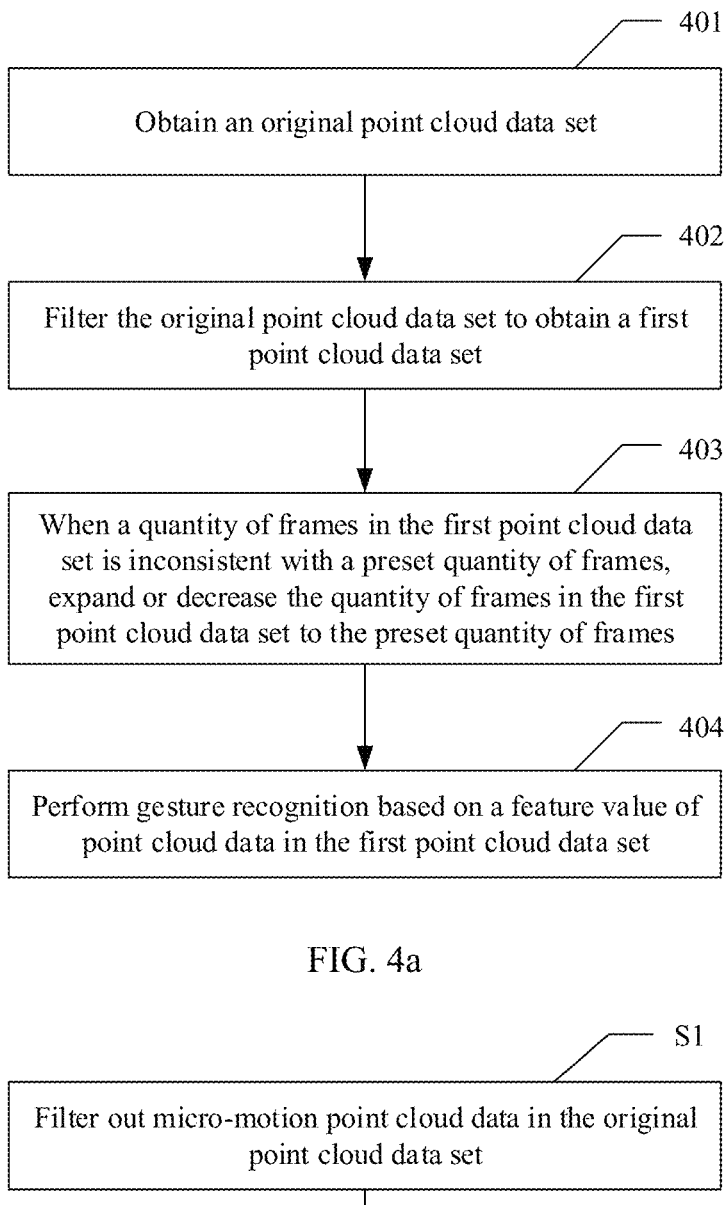

401

Obtain an original point cloud data set

402

Filter the original point cloud data set to obtain a first point cloud data set

403

When a quantity of frames in the first point cloud data set is inconsistent with a preset quantity of frames, expand or decrease the quantity of frames in the first point cloud data set to the preset quantity of frames

404

Perform gesture recognition based on a feature value of point cloud data in the first point cloud data set

Filter out micro-motion point cloud data in the original point cloud data set

S2

Determine, based on a horizontal distance between a cluster center at a current time and the cluster center at an initial time, whether point cloud data at the current time belongs to the first point cloud data set

FIG. 4b

GESTURE RECOGNITION METHOD AND RELATED APPARATUS

CROSS-REFERENCE TO RELATED APPLICATIONS

This application is a continuation of International Patent Application No. PCT/CN2021/088850, filed on Apr. 22, 2021, which claims priority to Chinese Patent Application No. 202010368240.2, filed on Apr. 30, 2020. The disclosures of the aforementioned applications are hereby incorporated by reference in their entireties.

TECHNICAL FIELD

Embodiments of this application relate to the field of information processing technologies, furthermore, to a gesture recognition method and a related apparatus.

BACKGROUND

In recent years, with rapid development of smart home and wearable devices, computing devices are ubiquitous and integrated into people's living environment. To facilitate interaction between a person and a computing device, in comparison with a conventional contact-type man-machine interaction mode, it is necessary to propose a more natural interaction mode or the like that enables a user to get free of an input device as much as possible, such as a mid-air gesture. The mid-air gesture is a non-contact air gesture that enables the user to perform an operation by hand. In essence, the mid-air gesture is a natural man-machine interaction mode that does not bring any inconvenience to user gesture interaction.

Mid-air gestures naturally express interaction intentions of users by using actions of fingers, wrists, and arms, and mainly include fingering, waving, first clenching, palm rotation, and the like. The gestures have characteristics such as wider interaction space, higher flexibility, and better interaction experience. Currently, depending on different sensing devices, there are mainly three types of gesture recognition technologies based on computer vision, ultrasonic, and electromagnetic wave signals.

Using the electromagnetic wave signal as an example, to recognize a gesture action, it is proposed that a radar based on a frequency modulated continuous wave (FMCW) modulation mode should be used to sense the gesture action. After a radar sensor sends radar signals to a user, the radar signals act on a human body to generate reflected signals. The radar sensor generates a point cloud data set based on these reflected signals. However, currently, it is difficult for the radar to determine whether the point cloud data set is point cloud data generated by a hand action or an effective gesture action. Consequently, a probability of unintentional triggering of gesture recognition is relatively high.

SUMMARY

Embodiments of this application provide a gesture recognition method, to reduce a probability of unintentional triggering of gesture recognition and improve man-machine interaction experience of a user.

According to a first aspect, an embodiment of this application provides a gesture recognition method. The method may include the following steps.

First, a gesture recognition apparatus obtains an original point cloud data set, where the original point cloud data set includes a plurality of point cloud data subsets, and each point cloud data subset corresponds to one frame in the original point cloud data set. Each point cloud data subset includes a plurality of pieces of point cloud data, the plurality of pieces of point cloud data correspond to a plurality of reflected signals, and the reflected signals correspond to radar signals transmitted by a radar apparatus.

Then the original point cloud data set is filtered to obtain a first point cloud data set. In some embodiments, the first point cloud data set includes a plurality of first point cloud data subsets, each first point cloud data subset corresponds to one frame in the first point cloud data set, and the plurality of first point cloud data subsets are continuous in time. Clustering processing is performed on the original point cloud data set, and then filtering is performed based on a maximum horizontal distance between cluster centers of each point cloud data subset in the original point cloud data set to obtain the first point cloud data set. In the first point cloud data subset, the cluster center is referred to as a first cluster center, and a maximum horizontal distance between any two first cluster centers in the first point cloud data set meets a first preset condition. Duration of the first point cloud data set meets the first preset condition, that is, duration from a first one of the first point cloud data subsets to a last one of the first point cloud data subsets in the first point cloud data set meets the first preset condition. The cluster center of each point cloud data subset in the original point cloud data set may be considered as a location of the human body in a detection area of the radar apparatus. Therefore, when the maximum horizontal distance between any two first cluster centers in the first point cloud data set is excessively large, it may be considered that the human body is walking or running. In this case, gesture recognition is not started. When the maximum horizontal distance between any two first cluster centers meets the first preset condition (less than a third threshold, where the third threshold may be 0.5 m, 0.8 m, 1 m, or 1.2 m, and is not limited herein), it may be considered that the human body is in a relatively stationary state. In this case, it may be considered that the human body is performing a gesture-based man-machine interaction operation, and gesture recognition is started. In addition, the original point cloud data set further needs to be filtered based on duration, and when the duration of the first point cloud data set (that is, the duration from the first one of the first point cloud data subsets to the last one of the first point cloud data subsets in the first point cloud data set) is excessively long, it is considered that a user is in the relatively stationary state. For example, using the radar apparatus deployed in a smart television as an example, when the user is in a state of watching a television program, gesture recognition is not started. When the duration of the first point cloud data set is excessively short, it is considered that the user shakes the body or performs another action of relatively short duration, such as scratching the head or holding a water cup, and gesture recognition is not started either. Gesture recognition is started only when the duration of the first point cloud data set meets the first preset condition (the duration of the first point cloud data set is greater than a fourth threshold and less than a fifth threshold, where the fourth threshold may be 0.3 second, 0.4 second, or 0.5 second, the fifth threshold may be 2.4 seconds, 2.5 seconds, 2.6 seconds, or 2.8 seconds, and the thresholds are not limited herein). For example, the duration of the first point cloud data set is shorter than 2.5 seconds and longer than 0.5 second.

Then gesture recognition is performed based on a feature value of point cloud data in the first point cloud data set, where the feature value includes at least one of a coordinate value, a distance, or a velocity of point cloud data in a spatial coordinate system.

In this embodiment of this application, the original point cloud data set is filtered to obtain the first point cloud data set. The first point cloud data set includes a plurality of frames of first point cloud data subsets, each frame of first point cloud data subset corresponds to one frame in the first point cloud data set, and the first point cloud data subsets are continuous in time. The maximum horizontal distance between any two first cluster centers in the first point cloud data set meets the first preset condition, and duration corresponding to the plurality of frames of first point cloud data subsets meets the first preset condition. Finally, gesture recognition is performed by using the feature value of the point cloud data in the first point cloud data set. A location change track of the first cluster center may be considered as a moving track of a detection target. Duration corresponding to a plurality of continuous first point cloud data subsets may be considered as moving duration of the detection target. Therefore, filtering can be performed on the original point cloud data set to effectively filter out a point cloud data set corresponding to an excessively large or excessively small moving track and filter out a point cloud data set corresponding to excessively long or excessively short moving duration. Point cloud data included in the point cloud data sets that are filtered out is invalid data. Then gesture recognition is performed by using the filtered point cloud data set. In this way, a probability of unintentional triggering is reduced, and man-machine interaction experience of the user is improved.

With reference to the first aspect, in an optional design of the first aspect, that gesture recognition is performed based on a feature value of point cloud data in the first point cloud data set includes: First, clustering processing is performed on each frame in the first point cloud data set to generate a second point cloud data set. In some embodiments, clustering processing is performed on a subclass with a largest amount of point cloud data in each frame. For example, a fifth frame in the first point cloud data set includes three subclasses, and each subclass includes several pieces of point cloud data. In this case, a subclass with a largest amount of point cloud data is selected as point cloud data of a fifth frame in the second point cloud data set, and then clustering processing is performed on the subclass. A resulting cluster center is referred to as a second cluster center. The second point cloud data set includes a plurality of frames of second point cloud data subsets, the second point cloud data subset is a subclass with a largest quantity of point clouds after clustering in a corresponding first point cloud data subset, the second point cloud data subset includes a second cluster center, and a bounding box size of the second cluster center is less than or equal to a bounding box size of the first cluster center. Then gesture recognition is performed based on a feature value of point cloud data in the second point cloud data set.

In this embodiment of this application, secondary clustering processing is performed on the point cloud data in the first point cloud data set to generate the second point cloud data set, where the second point cloud data set includes a plurality of second point cloud data subsets, the second point cloud data subset includes the second cluster center, and the bounding box size of the second cluster center is less than or equal to the bounding box size of the first cluster center. In a short-range scenario, reflected signals received by the radar apparatus are mainly reflected signals from a hand. However, in a long range scenario, because a field of view is larger, reflected signals received by the radar apparatus are reflected signals from a hand, a torso, and a multi-target body. Through the foregoing secondary clustering, point cloud data generated based on reflected signals from the torso or other targets can be effectively filtered, and accuracy of gesture recognition applied to the short range scenario is improved.

With reference to the first aspect, in an optional design of the first aspect, before clustering processing is performed on the first point cloud data set to generate the second point cloud data set, the method further includes: When a quantity of frames in the first point cloud data set is inconsistent with a preset quantity of frames, the first point cloud data set is normalized, where the quantity of frames in the first point cloud data set before normalization is expanded or decreased to the preset quantity of frames, a quantity of frames in the first point cloud data set after normalization is the preset quantity of frames, and the preset quantity of frames is determined by a frame rate of the radar signals transmitted by the radar apparatus. After obtaining the first point cloud data set, the gesture recognition apparatus checks whether the quantity of frames in the first point cloud data set (that is, a quantity of the first point cloud data subsets in the first point cloud data set) is consistent with the preset quantity of frames. The preset quantity of frames is determined by the frame rate of the radar signals transmitted by the radar apparatus 100. For example, the frame rate of the radar signals transmitted by the radar apparatus 100 is 20 hertz. When the quantity of frames in the first point cloud data set is 15 frames, it is inconsistent with the preset quantity of frames. In this case, the quantity of frames in the first point cloud data set needs to be increased to the preset quantity of frames (20) frames). When the quantity of frames in the first point cloud data set is 25 frames, it is inconsistent with the preset quantity of frames. In this case, the quantity of frames in the first point cloud data set needs to be decreased to the preset quantity of frames. Expanding or decreasing the quantity of frames in the first point cloud data set to the preset quantity of frames is referred to as "normalization" in this embodiment of this application.

Optionally, based on a time sequence, odd first point cloud data subsets in the first point cloud data set before normalization are selected as the first point cloud data set after normalization.

Optionally, based on a time sequence, even first point cloud data subsets in the first point cloud data set before normalization are selected as the first point cloud data set after normalization.

Optionally, based on a time sequence of the first point cloud data set, a union set of point cloud data in a plurality of frames of first point cloud data subsets in the first point cloud data set before normalization is selected as point cloud data of one first point cloud data subset in the first point cloud data set after normalization; or point cloud data of one first point cloud data subset in the first point cloud data set before normalization is selected as point cloud data of a plurality of frames of first point cloud data subsets in the first point cloud data set after normalization.

Optionally, the first point cloud data set is normalized by using the following method:

$$\tilde{\varphi}_i = \bigcup_{j=0}^{j<\gamma} \varphi_k,$$

$$\gamma = \max(2, \lceil t/F \rceil),$$

-continued $$\text{and } k = \max\left(0, \left\lceil (i+1) * \frac{t}{F} \right\rceil - j\right),$$

where $\tilde{\phi}$ is the first point cloud data set after normalization, $\phi$ is the first point cloud data set before normalization, $\tilde{\phi}_i$ is an $i^{th}$ frame of first point cloud data subset in the first point cloud data set after normalization, $\phi_k$ is a $k^{th}$ frame of point cloud data subset in the first point cloud data set before normalization, $\tilde{\phi}_i$ includes a union set of point cloud data in $\gamma \phi_k$s, t is a quantity of frames of point cloud data subsets in the original point cloud data set, and F is the preset quantity of frames.

Speeds of hand actions performed by different individuals are different. For example, Zhang San spends 0.8 second in drawing a circle with a right hand, and Li Si spends 1.2 seconds in drawing a circle with a right hand. Due to different time consumption, duration corresponding to different point cloud data sets also varies, and this causes difficulty in recognition. In this embodiment of this application, duration of first point cloud data sets generated by different individuals is normalized to the preset quantity of frames by performing normalization processing on the first point cloud data sets. Therefore, difficulty in gesture recognition is reduced, and accuracy of gesture recognition is improved.

With reference to the first aspect, in an optional design of the first aspect, that gesture recognition is performed based on a feature value of point cloud data in the second point cloud data set includes:

First, an average velocity value is determined based on velocities of various point cloud data in the second point cloud data subset, where the average velocity value is an average velocity value of various point cloud data in the second point cloud data subset. For example, the second point cloud data set includes five frames, and velocities of all point cloud data in the five frames of second point cloud data subsets are averaged. Then point cloud data inconsistent with a positive/negative property of the average velocity value, in the second point cloud data subset, is filtered out based on the average velocity value, and a third point cloud data subset is determined, where a velocity of each point cloud in the third point cloud data subset is consistent with the positive/negative property of the average velocity value. A third point cloud data set includes a plurality of such third point cloud data subsets, and a quantity of frames in the third point cloud data set is consistent with a quantity of frames in the second point cloud data set. Then gesture recognition is performed based on a feature value of point cloud data in the third point cloud data set.

In this embodiment of this application, the first point cloud data set is further filtered and processed, so that the point cloud data on which gesture recognition is finally performed better matches a real hand action of the human body. Therefore, accuracy of gesture recognition can be effectively improved.

With reference to the first aspect, in an optional design of the first aspect, as the human body normally breathes, the chest undulates, and reflected signals generated by radiation of radar signals on the chest are also recorded in a form of point cloud data in the original point cloud data set. Similarly, the human body cannot be completely motionless. When the human body shakes slightly, a location change of the human body is also recorded in the form of point cloud data in the point cloud data set. This type of point cloud data irrelevant to a hand action is referred to as "micro-motion point cloud data" in this embodiment of this application. To avoid adverse impact of the micro-motion point cloud data on subsequent gesture recognition, the micro-motion point cloud data needs to be filtered out from the original point cloud data set. In some embodiments, a first threshold is set, the point cloud data is filtered out from the original point cloud data set by using the first threshold, and all point cloud data whose velocity is less than or equal to the first threshold is filtered out from the original point cloud data set. Optionally, the first threshold is 0.15 meter per second or 0.10 meter per second. To ensure that actions corresponding to the first point cloud data set are continuous, a point cloud data subset whose duration between two adjacent frames in the original point cloud data set is greater than or equal to a second threshold is filtered out. A velocity of the point cloud data in the first point cloud data set is greater than the first threshold, and duration between two continuous frames of first point cloud data subsets in the first point cloud data set is less than the second threshold. In this embodiment of this application, the original point cloud data set is further filtered and processed, so that the first point cloud data set on which gesture recognition is finally performed better matches the real hand action of the human body. Therefore, accuracy of gesture recognition can be effectively improved.

With reference to the first aspect, in an optional design of the first aspect, the feature value undergoes variance processing, median processing, maximum/minimum value processing, or average value processing.

With reference to the first aspect, in an optional design of the first aspect, the feature value undergoes normalization processing. Normalization processing is performed on the feature value of the point cloud data in the first point cloud data set, so that a generalization capability of the gesture recognition apparatus can be effectively improved and that the gesture recognition apparatus can adapt to scenarios with different groups of people, different gesture amplitudes, and different distance spaces.

With reference to the first aspect, in an optional design of the first aspect, that gesture recognition is performed based on a feature value of point cloud data in the first point cloud data set includes: The feature value of the point cloud data in the first point cloud data set is processed by using a neural network model, and then gesture recognition is performed, where the neural network model includes a recurrent neural network (RNN), for example, a long short-term memory (LSTM) network, a bi-directional long short-term memory (Bi-LSTM) recurrent neural network, or a multi-layer long short-term memory (multi-LSTM) recurrent neural network. In this embodiment of this application, gesture recognition is performed based on the first point cloud data set after normalization processing, and in some embodiments, classification is performed by using the recurrent neural network. Therefore, complexity and a calculation amount of the neural network module can be effectively reduced and real-time performance of gesture recognition can be improved.

With reference to the first aspect, in an optional design of the first aspect, that gesture recognition is performed based on a feature value of point cloud data in the first point cloud data set includes: First, similarity calculation is performed based on the feature value of the point cloud data in the first point cloud data set and a preset point cloud data set. In some embodiments, a similarity between the first point cloud data set and the preset point cloud data set is calculated in a dynamic time planning manner or a vector cosine manner, and gesture recognition is performed based on the similarity. A quantity of preset point cloud data sets is not limited herein. The preset point cloud data sets may be one or more preset point cloud data sets, and each preset point cloud data set corresponds to one predefined gesture. For example, a preset point cloud data set A corresponds to waving to the right, a preset point cloud data set B corresponds to waving to the left, and a preset point cloud data set C corresponds to circling counterclockwise. The gesture recognition apparatus calculates the similarity between the first point cloud data set and the preset point cloud data set, and performs gesture recognition based on the similarity. Then a gesture corresponding to the first point cloud data set is determined based on a similarity calculation result. In this embodiment of this application, gesture recognition may be further performed based on the similarity calculation result, in addition to using the neural network model, thereby improving implementation flexibility of this application.

According to a second aspect, this application provides a gesture recognition apparatus, including:

an obtaining module, configured to obtain an original point cloud data set, where the original point cloud data set includes a plurality of pieces of point cloud data, the plurality of pieces of point cloud data correspond to a plurality of reflected signals, and the reflected signals correspond to radar signals transmitted by a radar apparatus; and a processing module, configured to filter the original point cloud data set to obtain a first point cloud data set, where the first point cloud data set includes a plurality of frames of first point cloud data subsets, each frame of first point cloud data subset corresponds to one frame in the first point cloud data set, the plurality of first point cloud data subsets are continuous in time, the first point cloud data subset includes a first cluster center, the first cluster center is a cluster center of a plurality of pieces of point cloud data in the first point cloud data subset, a maximum horizontal distance between any two first cluster centers meets a first preset condition, and duration of the first point cloud data set meets the first preset condition, where the processing module is further configured to perform gesture recognition based on a feature value of point cloud data in the first point cloud data set, where the feature value includes at least one of a coordinate value, a distance, or a velocity of point cloud data in a spatial coordinate system.

With reference to the second aspect, in an optional design of the second aspect, the processing module is configured to perform clustering processing on the first point cloud data set to generate a second point cloud data set, where the second point cloud data set includes a plurality of frames of second point cloud data subsets, the second point cloud data subset is a subclass with a largest amount of point cloud data after clustering in a corresponding first point cloud data subset, the second point cloud data subset includes a second cluster center, and a bounding box size of the second cluster center is less than or equal to a bounding box size of the first cluster center; and the processing module is configured to perform gesture recognition based on a feature value of point cloud data in the second point cloud data set.

With reference to the second aspect, in an optional design of the second aspect, the processing module is further configured to normalize the first point cloud data set when a quantity of frames in the first point cloud data set is inconsistent with a preset quantity of frames, where the quantity of frames in the first point cloud data set before normalization is expanded or decreased to the preset quantity of frames, a quantity of frames in the first point cloud data set after normalization is the preset quantity of frames, and the preset quantity of frames is determined by a frame rate of the radar signals transmitted by the radar apparatus.

With reference to the second aspect, in an optional design of the second aspect, the processing module is configured to: based on a time sequence of the first point cloud data set, select a union set of point cloud data in a plurality of frames of first point cloud data subsets in the first point cloud data set before normalization as point cloud data of one first point cloud data subset in the first point cloud data set after normalization; or select point cloud data of one first point cloud data subset in the first point cloud data set before normalization as point cloud data of a plurality of frames of first point cloud data subsets in the first point cloud data set after normalization.

With reference to the second aspect, in an optional design of the second aspect, the processing module is configured to determine an average velocity value based on velocities of various point cloud data in the second point cloud data subset, where the average velocity value is an average velocity value of various point cloud data in the second point cloud data subset; the processing module is configured to filter out point cloud data inconsistent with a positive/negative property of the average velocity value, in the second point cloud data subset based on the average velocity value, and determine a third point cloud data subset, where a velocity of each point cloud in the third point cloud data subset is consistent with the positive/negative property of the average velocity value; and the processing module is configured to perform gesture recognition based on a feature value of point cloud data in a third point cloud data set, where the third point cloud data set includes a plurality of such third point cloud data subsets, and a quantity of frames in the third point cloud data set is consistent with a quantity of frames in the second point cloud data set.

With reference to the second aspect, in an optional design of the second aspect, a velocity of the point cloud data in the first point cloud data set is greater than a first threshold, and duration between two continuous frames of first point cloud data subsets in the first point cloud data set is less than a second threshold.

With reference to the second aspect, in an optional design of the second aspect, the feature value undergoes variance processing, median processing, maximum/minimum value processing, or average value processing.

With reference to the second aspect, in an optional design of the second aspect, the feature value undergoes normalization processing.

With reference to the second aspect, in an optional design of the second aspect, the processing module is configured to process the feature value of the point cloud data in the first point cloud data set by using a neural network model, and then perform gesture recognition, where the neural network model includes a recurrent neural network.

With reference to the second aspect, in an optional design of the second aspect, the processing module is configured to perform similarity calculation based on the feature value of the point cloud data in the first point cloud data set and a preset point cloud data set; and the processing module is configured to determine, based on a similarity calculation result, a gesture corresponding to the first point cloud data set.

With reference to the second aspect, in an optional design of the second aspect, the first preset condition is as follows: The maximum horizontal distance between any two first cluster centers is less than a third threshold, and duration corresponding to the duration of the first point cloud data set is less than a fourth threshold and greater than a fifth threshold.

According to a third aspect, this application provides a radar apparatus, including a radar antenna and a processor, where the radar antenna is communicatively connected to the processor, and the radar antenna is configured to send radar signals, receive reflected signals of the radar signals, and transmit the reflected signals to the processor; and the processor is configured to obtain an original point cloud data set, where the original point cloud data set includes a plurality of pieces of point cloud data, the plurality of pieces of point cloud data correspond to a plurality of reflected signals, and the reflected signals correspond to the radar signals transmitted by the radar apparatus: filter the original point cloud data set to obtain a first point cloud data set, where the first point cloud data set includes a plurality of frames of first point cloud data subsets, the first point cloud data subset includes a first cluster center, the first cluster center is a cluster center of a plurality of pieces of point cloud data in the first point cloud data subset, a maximum horizontal distance between any two first cluster centers meets a first preset condition, and duration of the first point cloud data set meets the first preset condition; and perform gesture recognition based on a feature value of point cloud data in the first point cloud data set, where the feature value includes at least one of a coordinate value, a distance, or a velocity of point cloud data in a spatial coordinate system.

With reference to the third aspect, in an optional design of the third aspect, the processor is configured to perform clustering processing on the first point cloud data set to generate a second point cloud data set, where the second point cloud data set includes a plurality of frames of second point cloud data subsets, the second point cloud data subset is a subclass with a largest amount of point cloud data after clustering in a corresponding first point cloud data subset, the second point cloud data subset includes a second cluster center, and a bounding box size of the second cluster center is less than or equal to a bounding box size of the first cluster center; and perform gesture recognition based on a feature value of point cloud data in the second point cloud data set.

With reference to the third aspect, in an optional design of the third aspect, the processor is further configured to normalize the first point cloud data set when a quantity of frames in the first point cloud data set is inconsistent with a preset quantity of frames, where the quantity of frames in the first point cloud data set before normalization is expanded or decreased to the preset quantity of frames, a quantity of frames in the first point cloud data set after normalization is the preset quantity of frames, and the preset quantity of frames is determined by a frame rate of the radar signals transmitted by the radar apparatus.

With reference to the third aspect, in an optional design of the third aspect, the processor is configured to: based on a time sequence of the first point cloud data set, select a union set of point cloud data in a plurality of frames of first point cloud data subsets in the first point cloud data set before normalization as point cloud data of one first point cloud data subset in the first point cloud data set after normalization; or select point cloud data of one first point cloud data subset in the first point cloud data set before normalization as point cloud data of a plurality of frames of first point cloud data subsets in the first point cloud data set after normalization.

With reference to the third aspect, in an optional design of the third aspect, the processor is configured to determine an average velocity value based on velocities of various point cloud data in the second point cloud data subset, where the average velocity value is an average velocity value of various point cloud data in the second point cloud data subset: filter out point cloud data inconsistent with a positive/negative property of the average velocity value, in the second point cloud data subset based on the average velocity value, and determine a third point cloud data subset, where a velocity of each piece of point cloud data in the third point cloud data subset is consistent with the positive/negative property of the average velocity value; and perform gesture recognition based on a feature value of point cloud data in a third point cloud data set, where the third point cloud data set includes a plurality of such third point cloud data subsets, and a quantity of frames in the third point cloud data set is consistent with a quantity of frames in the second point cloud data set.

With reference to the third aspect, in an optional design of the third aspect, a velocity of the point cloud data in the first point cloud data set is greater than a first threshold, and duration between two continuous frames of first point cloud data subsets in the first point cloud data set is less than a second threshold.

With reference to the third aspect, in an optional design of the third aspect, the feature value undergoes variance processing, median processing, maximum/minimum value processing, or average value processing.

With reference to the third aspect, in an optional design of the third aspect, the feature value undergoes normalization processing.

With reference to the third aspect, in an optional design of the third aspect, the processor is configured to process the feature value of the point cloud data in the first point cloud data set by using a neural network model, and then perform gesture recognition, where the neural network model includes a recurrent neural network.

With reference to the third aspect, in an optional design of the third aspect, the processor is configured to perform similarity calculation based on the feature value of the point cloud data in the first point cloud data set and a preset point cloud data set; and determine, based on a similarity calculation result, a gesture corresponding to the first point cloud data set.

With reference to the third aspect, in an optional design of the third aspect, the first preset condition is as follows: The maximum horizontal distance between any two first cluster centers is less than a third threshold, and duration corresponding to the duration of the first point cloud data set is less than a fourth threshold and greater than a fifth threshold.

According to a fourth aspect, this application provides a gesture recognition system, including a radar apparatus and the gesture recognition apparatus according to any one of the second aspect and the optional designs of the second aspect. The radar apparatus is communicatively connected to the gesture recognition apparatus; the radar apparatus is configured to send radar signals; the radar apparatus is further configured to receive reflected signals, generate an original point cloud data set based on the reflected signals, and send the original point cloud data set to the gesture recognition apparatus; and the gesture recognition apparatus is configured to perform gesture recognition based on the original point cloud data set, and perform the gesture recognition method according to any one of the first aspect and the optional designs of the first aspect.

According to a fifth aspect, this application further provides a gesture recognition apparatus. The apparatus includes a processor and a memory, where the memory is configured to store program code, and transmit the program code to the processor; and the processor is configured to perform the gesture recognition method according to any one of the first aspect and the optional designs of the first aspect according to instructions in the program code.

According to a sixth aspect, this application further provides an Internet of Things device. The Internet of Things device includes the gesture recognition apparatus according to any one of the second aspect and the optional designs of the second aspect.

According to a seventh aspect, this application provides a system-on-chip. The system-on-chip includes a processor configured to support a radar apparatus in implementing functions in the foregoing aspect, for example, sending or processing data and/or information in the foregoing method. In a possible design, the system-on-chip further includes a memory, where the memory is configured to store program instructions and data necessary for the radar apparatus. The system-on-chip may include a chip, or may include a chip and another discrete device.

According to an eighth aspect, this application provides a computer-readable storage medium, including a program. When the program runs on a computer, the computer is enabled to perform the method according to the first aspect.

It can be learned from the foregoing technical solutions that embodiments of this application have the following advantages.

The original point cloud data set is filtered to obtain the first point cloud data set. The first point cloud data set includes a plurality of frames of first point cloud data subsets, each frame of first point cloud data subset corresponds to one frame in the first point cloud data set, and the first point cloud data subsets are continuous in time. The maximum horizontal distance between any two first cluster centers in the first point cloud data set meets the first preset condition, and the duration of the first point cloud data set meets the first preset condition. Finally, gesture recognition is performed based on the feature value of the point cloud data in the first point cloud data set.

A location change track of each first cluster center in the first point cloud data set may be considered as a moving track of the detection target (for example, the hand); and the duration of the first point cloud data set may be considered as the moving duration of the detection target. Therefore, filtering can be performed on the original point cloud data set to effectively filter out point cloud data corresponding to an excessively large or excessively small moving track and filter out point cloud data corresponding to excessively long or excessively short moving duration. Then gesture recognition is performed by using the filtered point cloud data set (first point cloud data set). In this way, a probability of unintentional triggering of gesture recognition is reduced, and man-machine interaction experience of the user is improved.

BRIEF DESCRIPTION OF DRAWINGS

FIG. 4a is a schematic diagram of an embodiment of a gesture recognition method according to an embodiment of this application:

FIG. 4b is a schematic flowchart for filtering an original point cloud data set according to an embodiment of this application:

DESCRIPTION OF EMBODIMENTS

An embodiment of this application provides a gesture recognition method, so that point cloud data whose moving track does not match gesture motion can be effectively filtered out by filtering an original point cloud data set. Point cloud data included in the point cloud data sets that are filtered out is invalid data. Then gesture recognition is performed by using the filtered point cloud data set. In this way, a probability of unintentional triggering can be reduced, and man-machine interaction experience of a user is improved.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following describes embodiments of this application with reference to the accompanying drawings. A person of ordinary skill in the art may know that, with development of technologies and emergence of a new scenario, the technical solutions provided in the embodiments of this application are also applicable to similar technical problems.

Figure 1:
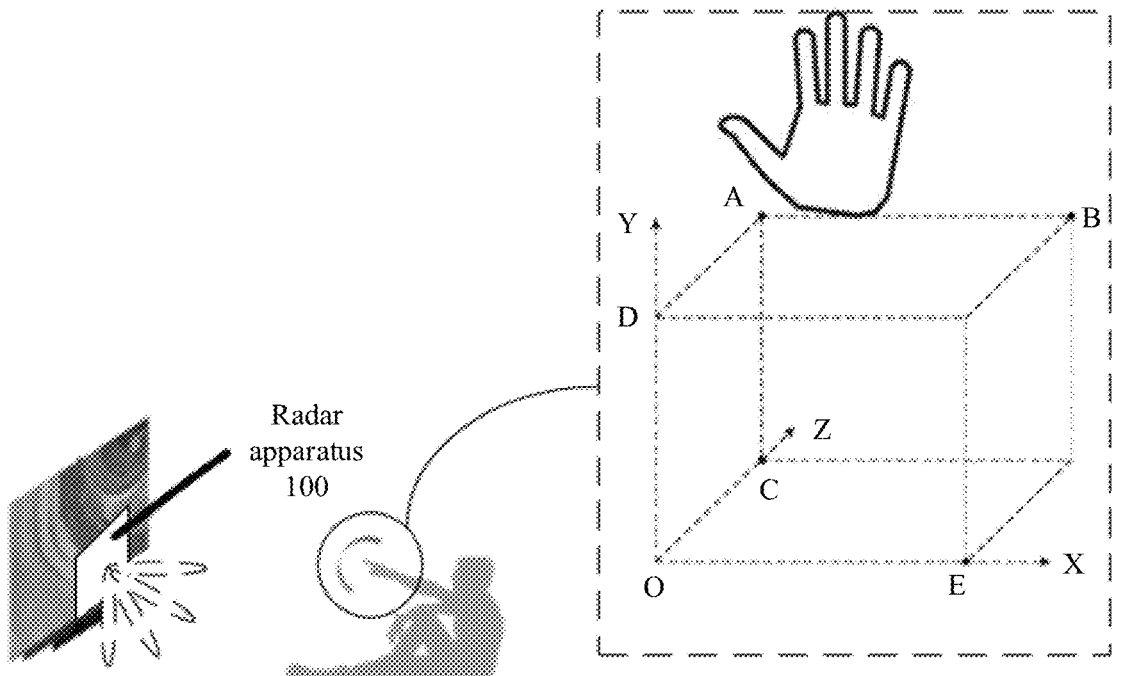
FIG. 1 is a schematic diagram of an application scenario according to an embodiment of this application.

FIG. 1 is a schematic diagram of an application scenario according to an embodiment of this application. As shown in FIG. 1, a radar apparatus 100 is integrated in a television. Alternatively, the radar apparatus 100 may be integrated in other products (for example, products that require users to perform contactless man-machine interaction, such as bedside lamps, computers, smartphones, smart watches, or smart switches). Alternatively, the radar apparatus 100 may be an independent detection apparatus. In the scenario shown in FIG. 1, a user waves a hand in a monitoring area of the radar apparatus 100, and the hand forms a moving track in a spatial coordinate system shown in FIG. 1 (for example but not limited to an x-y-z axis spatial rectangular coordinate system). The radar apparatus 100 may send a radar signal to a human body, and receive a reflected signal of the radar signal. Depending on different specific implementations of the radar apparatus 100, the radar signal may have a variety of carriers. For example, when the radar apparatus 100 is a microwave radar, the radar signal is a microwave signal (microwave); when the radar apparatus 100 is an ultrasonic radar, the radar signal is an ultrasonic signal; or when the radar apparatus 100 is a laser radar, the radar signal is a laser signal. It should be noted that when the radar apparatus 100 integrates a plurality of different radars, the radar signal may be a set of a plurality of radar signals. This is not limited herein. In addition to the spatial rectangular coordinate system shown in FIG. 1, another spatial coordinate system such as a cylindrical coordinate system or a polar coordinate system may be used. Correspondingly, when different spatial coordinate systems are selected, feature values of point cloud data may be different. This is not limited in this application. For example, in this embodiment of this application, a relationship between a spatial coordinate system to which a gesture recognition method is applied and a feature value of point cloud data is shown in Table 1.

TABLE 1

| Spatial coordinate system | Feature value of point cloud data (one or more) |
|---|---|
| Spatial rectangular coordinate system | X-axis coordinate, y-axis coordinate, z-axis coordinate, velocity, and acceleration |
| Cylindrical coordinate system | Pitch angle, horizontal angle, radial range, velocity, and acceleration |
| Spherical coordinate system | Spherical coordinate value, azimuth, angle of |
| Spatial coordinate system | Feature value of point cloud data (one or more) depression, velocity, and acceleration |

It should be noted that the scenario shown in FIG. 1 is merely an example. In other scenarios, as long as the user performs man-machine interaction in the scenarios, including gesture interaction and interaction based on motion of another part of the human body, for example, a foot, a head, or a torso, the radar apparatus 100 can monitor the human body. This is not limited herein.

Figure 2:
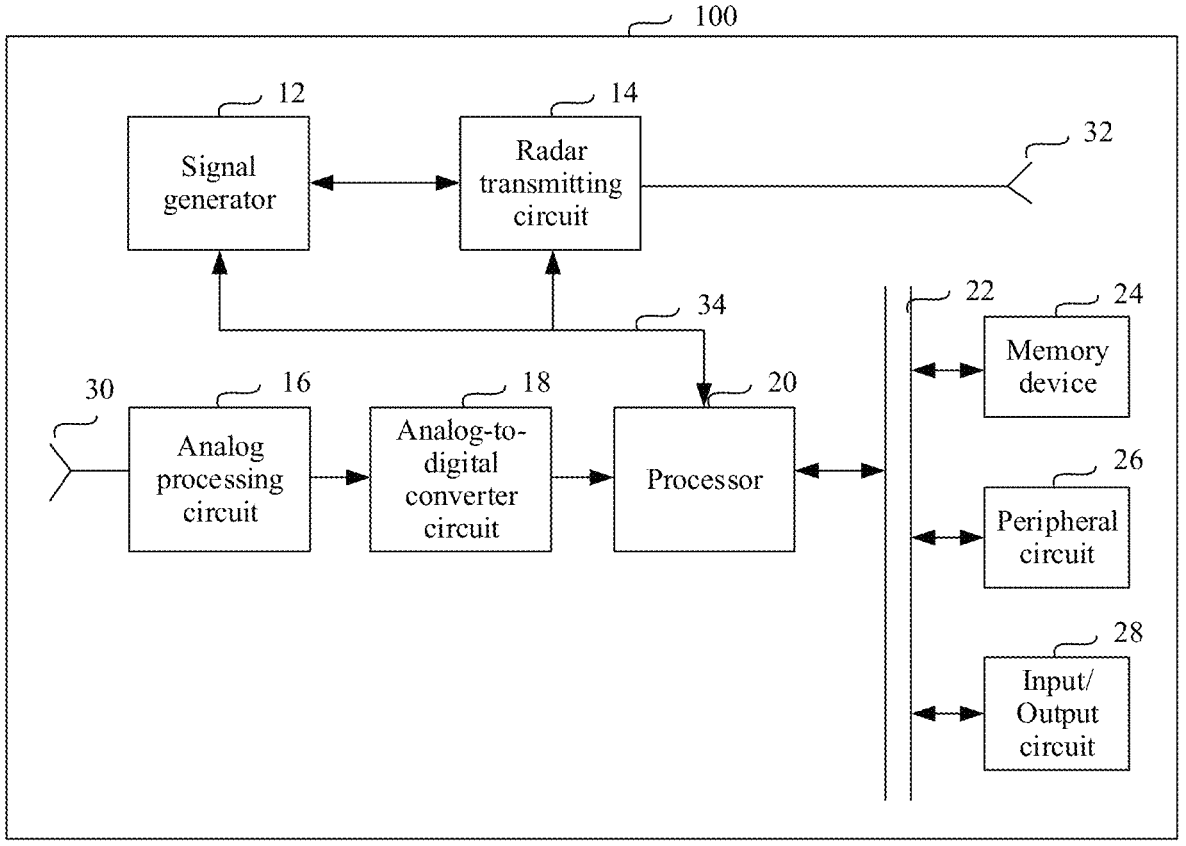
FIG. 2 is a schematic diagram of an architecture of a radar apparatus 100 according to an embodiment of this application.

Next, assuming that the radar apparatus 100 is a microwave radar, an architecture of the radar apparatus 100 is described. FIG. 2 is a schematic diagram of an architecture of a radar apparatus 100 according to an embodiment of this application. The radar apparatus 100 may generate a radar signal and transmit the radar signal to an area being monitored by the radar apparatus 100. Signal generation and transmission may be implemented by an RF signal generator 12, a radar transmitting circuit 14, and a transmitting antenna 32. The radar transmitting circuit 14 generally includes any circuit required for generating a signal to be transmitted through the transmitting antenna 32, such as a pulse shaping circuit, a transmission trigger circuit, an RF switch circuit, or any other suitable transmitting circuit used by the radar apparatus 100. The RF signal generator 12 and the radar transmitting circuit 14 may be controlled by using a processor 20. The processor sends out a command and a control signal by using a control line 34, so that the transmitting antenna 32 transmits an expected RF signal having an expected configuration and an expected signal parameter.

The radar apparatus 100 further receives a returned radar signal at a radar receiving and analog processing circuit 16 through a receiving antenna 30. The returned radar signal may be referred to as an "echo", an "echo signal", or a "reflected signal" in this specification. The radar receiving and analog processing circuit 16 generally includes any circuit required for processing signals received through the receiving antenna 30 (for example, signal separation, mixing, heterodyne and/or homodyne conversion, amplification, filtering, signal reception triggering, signal switching, and routing, and/or any other suitable radar signal receiving function performed by the radar apparatus 100). Therefore, the radar receiving and analog processing circuit 16 generates one or more analog signals processed by the radar apparatus 100, such as an in-phase (I) analog signal and a quadrature (Q) analog signal. The resulting analog signal is transmitted to an analog-to-digital converter (ADC) circuit 18, and digitized by the circuit. The digitized signal is then forwarded to the processor 20 for processing the reflected signal.

The processor 20 may be one of various processors for implementing the following functions: The processor is capable of processing the digitized received signal and controlling the RF signal generator 12 and the radar transmitting circuit 14 to provide a radar operation and function of the radar apparatus 100. Therefore, the processor 20 may be a digital signal processor (DSP), a microprocessor, a microcontroller, or any other device of this type. To perform the radar operation and function of the radar apparatus 100, the processor 20 is connected to one or more other required circuits (for example, one or more memory devices 24 including one or more types of memories, any required peripheral circuit 26, and any required input/output circuit 28) by using a system bus 22.

The processor 20 may be connected to the RF signal generator 12 and the radar transmitting circuit 14 by using the control line 34. In an alternative embodiment, the RF signal generator 12 and/or the radar transmitting circuit 14 may be connected to a bus 22, so that the RF signal generator 12 and/or the radar transmitting circuit 14 can communicate with one or more of the processor 20, the memory device 24, the peripheral circuit 26, and the input/output circuit 28 by using the bus 22.

In an optional implementation, the processor 20 processes reflected signals to generate an original point cloud data set. Then the processor 20 generates a first point cloud data set based on the original point cloud data set, and performs gesture recognition based on the first point cloud data set. In this case, the radar apparatus 100 is equivalent to a gesture recognition apparatus provided in an embodiment of this application, and the radar apparatus 100 constitutes a gesture recognition system provided in an embodiment of this application.

In another optional implementation, the processor 20 processes reflected signals to generate an original point cloud data set. Then the processor 20 outputs the original point cloud data set through the input/output circuit 28 to an Internet of Things device connected to the radar apparatus 100, for example, a smart television, a bedside lamp, a smartphone, a smart watch, a computer device, or a server deployed in the cloud. The Internet of Things device processes the original point cloud data set to generate a first point cloud data set, and performs gesture recognition based on the first point cloud data set. In this case, a gesture recognition method provided in an embodiment of this application is deployed in the Internet of Things device, and a gesture recognition apparatus provided in an embodiment of this application is deployed in the Internet of Things device. The Internet of Things device and the radar apparatus 100 constitute a gesture recognition system provided in an embodiment of this application.

The following describes embodiments of this application with reference to the accompanying drawings in embodiments of this application. Terms used in embodiments of this application are only used to explain specific embodiments of this application, but are not intended to limit this application.

First, a source of the original point cloud data set in the embodiments of this application is described with reference to the accompanying drawings. The embodiments of this application are described based on an assumption that the radar apparatus 100 is a multiple-input multiple-output frequency modulated continuous wave radar (MIMO FMCW Radar).

Figure 3A:
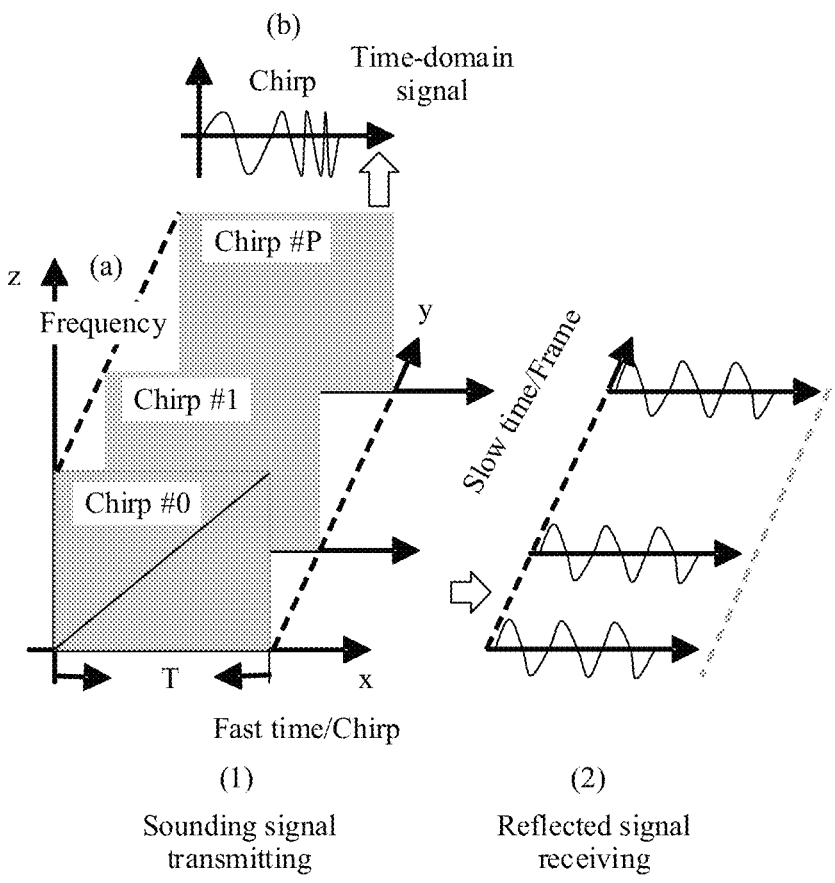
FIG. 3a is a schematic flowchart for processing radar signals of a multiple-input multiple-output frequency modulated continuous wave radar according to an embodiment of this application.

FIG. 3a is a schematic flowchart for processing radar signals of a multiple-input multiple-output frequency modulated continuous wave radar according to an embodiment of this application. (1) in FIG. 3a shows that a radar apparatus periodically transmits a radar signal (electromagnetic wave signal) through a transmitting antenna.

Types of radar signals may include at least two types: a continuous wave (CW) signal and a chirp signal.

This embodiment of this application is described based on an assumption that the radar signal is a chirp signal. The chirp signal is an electromagnetic wave signal whose frequency varies with time. Generally, a frequency of a rising chirp signal increases with time, while a frequency of a falling chirp signal decreases with time. The frequency variation of the chirp signal may be in a plurality of different forms. For example, a frequency of a linear frequency modulation (LFM) signal varies linearly. Other forms of frequency variations in the chirp signal include an exponential variation.

In addition to the chirp signals of the latter type in which the frequency varies continuously based on some predetermined functions (that is, linear functions or exponential functions), a chirp signal in a form of a stepped chirp signal with a frequency-stepped variation may also be generated. In other words, a typical stepped chirp signal includes a plurality of frequency steps, where a frequency is constant within predetermined duration of each step. The stepped chirp signal may also be pulsed on and off, where the pulse is on in a predetermined period of time in each step of chirp sweeping.

The number of times that the radar apparatus sends a chirp signal per second is referred to as a frame rate of the radar signal. (a) shows a frequency domain representation of the signal. In some embodiments, in (a), an x-axis is a fast time axis, and represents a time interval directly from a start time to an end time of the chirp signal, for example, duration of a chirp signal "Chirp #0" is "T": a z-axis represents the frequency; and a y-axis is a slow time axis, and represents a quantity of chirp signals transmitted by the radar apparatus in a time interval, for example, in a time interval "T", the radar apparatus sends chirp signals "Chirp #0", "Chirp #1" . . . "Chirp #P". In other words, one frame of radar signal includes P chirp signals, where P is a positive integer.

Figure 3B:
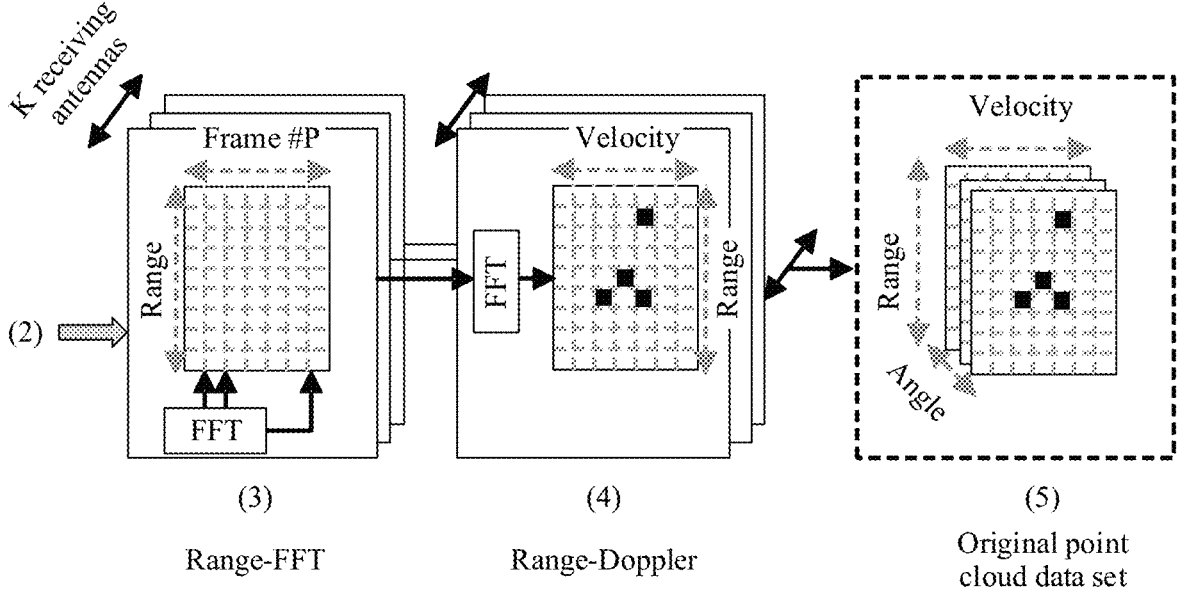
FIG. 3b is another schematic flowchart for processing radar signals of a multiple-input multiple-output frequency modulated continuous wave radar according to an embodiment of this application.

After the radar apparatus sends the radar signals, the radar signals act on other objects, and reflected signals are generated. The radar apparatus receives the reflected signals by using a receiving antenna. For example, as shown in (2) in FIG. 3a, the radar apparatus performs demodulation processing on these reflected signals, and then performs analog-to-digital conversion processing, to obtain the chirp signals received by each receiving antenna. In some embodiments, FIG. 3b is another schematic flowchart for processing radar signals of a multiple-input multiple-output frequency modulated continuous wave radar according to an embodiment of this application. The radar apparatus receives reflected signals by using K receiving antennas, where K is a positive integer. Then the radar apparatus performs fast Fourier transformation (FFT) on each chirp signal received by each antenna, and obtains a range-FFT result corresponding to the chirp signal, where the range-FFT includes a frequency domain signal (which may be a complex value or a modulus value) obtained after FFT calculation of the chirp signal. FFT is a signal processing technology used to transform a time domain sample of a signal into a frequency domain sample. For example, (3) in FIG. 3b shows range-FFT of all chirp signals in one frame received by a single receiving antenna. A horizontal coordinate corresponds to an FFT result of P chirp signals in one frame, a vertical coordinate corresponds to FFT data after FFT of each chirp signal, each range-bin on a vertical axis corresponds to a range resolution $r_{res}$, and the range resolution is in units of meters. The range-bin is also referred to as each frequency in the range-FFT, and each frequency corresponds to distance information between the radar and a target.

After range-FFT of chirp signals in one frame on each receiving antenna is obtained, FFT calculation is performed on a total of P values on each range-bin, to obtain a range-Doppler spectrum formed by two-dimensional Fourier transform (2D-FFT) results on all range-bins in the frame. For example, a horizontal coordinate shown in (4) in FIG. 3b is a velocity, and each cell of the horizontal coordinate represents a velocity resolution $v_{res}$, so that targets having different velocities at different distances are recognized.

After the range-Doppler spectrum is obtained, point cloud data is generated based on the range-Doppler spectrum, and a set of the point cloud data is referred to as an original point cloud data set. In some embodiments, as shown in (5) in FIG. 3b, digital beamforming is performed on reflected signals based on velocities and distances of different targets to enhance signal-to-noise ratios of the targets, and angle estimation is performed based on targets in a same range-Doppler spectrum on each antenna. Then point cloud data from different directions at a same distance (r) and at a same velocity (v) are estimated. The angle estimation can calculate a horizontal azimuth ($\alpha$) and a vertical pitch angle ($\theta$) of the point cloud data based on horizontal and vertical antenna array distribution, and calculate x, y, and z coordinates of the point cloud data in a spatial rectangular coordinate system based on the distance (r), the horizontal azimuth α, and the vertical pitch angle (θ). Finally, an original point cloud data set q is obtained, where each piece of point cloud data in the original point cloud data set includes one or more of the following feature values: a horizontal azimuth (α), a vertical pitch angle (θ), a distance (r), a velocity (v), a coordinate value (x, y, z), or a radial range (R).

Optionally, the original point cloud data set may be processed by using a noise reduction algorithm, so that point cloud data corresponding to noise is filtered out. The noise reduction algorithm includes but is not limited to a principal component analysis (PCA) algorithm, a bilateral filter, a guided filter, or the like.

Figure 3C:
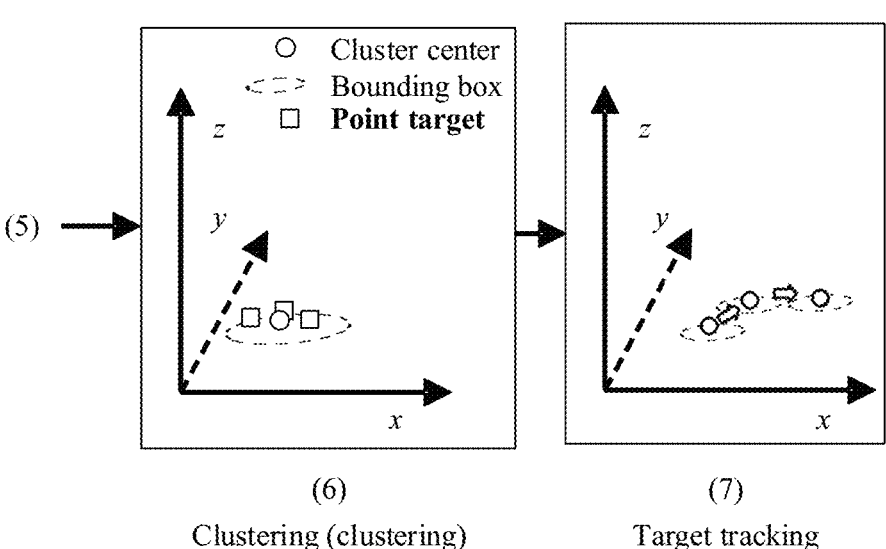
FIG. 3c is a schematic diagram for clustering processing according to an embodiment of this application.

Optionally, clustering processing may be further performed on the original point cloud data set. In some embodiments, because multi-directional reflected signals are generated when radar signals are radiated on an object, the radar apparatus generates an original point cloud data set based on the received reflected signals, and a large amount of point cloud data corresponding to invalid reflected signals exists in the original point cloud data set. For example, assuming that an object detected by the radar apparatus is a hand, point cloud data corresponding to reflected signals generated by other parts of the human body is also recorded in the original point cloud data set. Therefore, clustering processing needs to be performed on the scattered point cloud data to obtain a cluster center. An optional clustering processing algorithm in this embodiment of this application includes but is not limited to: a density-based spatial clustering of applications with noise (DBSCAN) algorithm, a balanced iterative reducing and clustering using hierarchies (BIRCH) method, a k-means clustering algorithm, a density-based clustering algorithm DENCLUE), or the like. For ease of understanding. FIG. 3c is a schematic diagram for clustering processing according to an embodiment of this application. (6) in FIG. 3c is clustering processing performed on the original point cloud data set in (5) in FIG. 3b. In (6) in FIG. 3c, assuming that a bounding box includes three pieces of point cloud data "□", clustering processing is performed on the point cloud data in the bounding box to obtain a cluster center "○". Clustering processing is performed on each frame of point cloud data subset in the original point cloud data set to obtain a moving track of the cluster center, as shown in (7) in FIG. 3c.

In this embodiment of this application, the original point cloud data set may be a point cloud data set that does not undergo noise reduction processing or clustering processing, as shown in (5) in FIG. 3b, or may be a point cloud data set obtained after noise reduction processing is performed on the point cloud data set shown in (5) in FIG. 3b, or may be a point cloud data set obtained after clustering processing is performed on the point cloud data set shown in (5) in FIG. 3b, or may be a point cloud data set obtained after noise reduction processing is first performed and then clustering processing is performed on the point cloud data set shown in (5) in FIG. 3b. This is not limited in this application.

Next, a gesture recognition method provided in an embodiment of this application is described. FIG. 4a is a schematic diagram of an embodiment of a gesture recognition method according to an embodiment of this application. The gesture recognition method provided in this embodiment of this application includes the following steps.

401. Obtain an original point cloud data set.

In this embodiment, a gesture recognition apparatus obtains an original point cloud data set, where the original point cloud data set includes a plurality of point cloud data subsets, and each point cloud data subset corresponds to one frame in the original point cloud data set. Each point cloud data subset includes a plurality of pieces of point cloud data, the plurality of pieces of point cloud data correspond to a plurality of reflected signals, and the reflected signals correspond to radar signals transmitted by a radar apparatus. For related descriptions of the original point cloud data set, refer to FIG. 3a to FIG. 3c and related text descriptions. Details are not described herein again.

The gesture recognition apparatus may be integrated with the radar apparatus, and the gesture recognition apparatus is implemented by a processor in the radar apparatus. Alternatively, the gesture recognition apparatus and the radar apparatus may be independent of each other. In this case, the radar apparatus is configured to transmit radar signals and receive reflected signals, and generate an original point cloud data set based on the reflected signals. The gesture recognition apparatus is configured to perform gesture recognition by using the original point cloud data set.

402. Filter the original point cloud data set to obtain a first point cloud data set.

In this embodiment, the gesture recognition apparatus filters the original point cloud data set to obtain the first point cloud data set. In some embodiments, the first point cloud data set includes a plurality of first point cloud data subsets, each first point cloud data subset corresponds to one frame in the first point cloud data set, and the plurality of first point cloud data subsets are continuous in time.

Clustering processing is performed on the original point cloud data set, and then filtering is performed based on a maximum horizontal distance between cluster centers of each point cloud data subset in the original point cloud data set to obtain the first point cloud data set. In the first point cloud data subset, the cluster center is referred to as a first cluster center, and a maximum horizontal distance between any two first cluster centers in the first point cloud data set meets a first preset condition. Duration of the first point cloud data set meets the first preset condition, that is, duration from a first one of the first point cloud data subsets to a last one of the first point cloud data subsets in the first point cloud data set meets the first preset condition.

The cluster center of each point cloud data subset in the original point cloud data set may be considered as a location of the human body in a detection area of the radar apparatus 100. Therefore, when the maximum horizontal distance between any two first cluster centers in the first point cloud data set is excessively large, it may be considered that the human body is walking or running. In this case, gesture recognition is not started. When the maximum horizontal distance between any two first cluster centers meets the first preset condition (less than a third threshold, where the third threshold may be 0.5 m, 0.8 m, 1 m, or 1.2 m, and is not limited herein), it may be considered that the human body is in a relatively stationary state. In this case, it may be considered that the human body is performing a gesture-based man-machine interaction operation, and gesture recognition is started.

In addition, the original point cloud data set further needs to be filtered based on duration, and when the duration of the first point cloud data set (that is, the duration from the first one of the first point cloud data subsets to the last one of the first point cloud data subsets in the first point cloud data set) is excessively long, it is considered that a user is in the relatively stationary state. For example, using the radar apparatus 100 deployed in a smart television as an example, when the user is in a state of watching a television program, gesture recognition is not started. When the duration of the first point cloud data set is excessively short, it is considered that the user shakes the body or performs another action of relatively short duration, such as scratching the head or holding a water cup, and gesture recognition is not started either. Gesture recognition is started only when the duration of the first point cloud data set meets the first preset condition (the duration of the first point cloud data set is greater than a fourth threshold and less than a fifth threshold, where the fourth threshold may be 0.3 second, 0.4 second, or 0.5 second, the fifth threshold may be 2.4 seconds, 2.5 seconds, 2.6 seconds, or 2.8 seconds, and the thresholds are not limited herein). For example, the duration of the first point cloud data set is shorter than 2.5 seconds and longer than 0.5 second.

For a specific filtering manner, refer to a subsequent embodiment corresponding to FIG. 4b.

403. When a quantity of frames in the first point cloud data set is inconsistent with a preset quantity of frames, expand or decrease the quantity of frames in the first point cloud data set to the preset quantity of frames.

In this embodiment, after obtaining the first point cloud data set, the gesture recognition apparatus checks whether the quantity of frames in the first point cloud data set (that is, a quantity of the first point cloud data subsets in the first point cloud data set) is consistent with the preset quantity of frames. The preset quantity of frames is determined by the frame rate of the radar signals transmitted by the radar apparatus 100. For example, the frame rate of the radar signals transmitted by the radar apparatus 100 is 20 hertz. When the quantity of frames in the first point cloud data set is 15 frames, it is inconsistent with the preset quantity of frames. In this case, the quantity of frames in the first point cloud data set needs to be increased to the preset quantity of frames (20 frames). When the quantity of frames in the first point cloud data set is 25 frames, it is inconsistent with the preset quantity of frames. In this case, the quantity of frames in the first point cloud data set needs to be decreased to the preset quantity of frames.

Expanding or decreasing the quantity of frames in the first point cloud data set to the preset quantity of frames is referred to as "normalization" in this embodiment of this application. The following describes different normalization modes separately. In the description, it is assumed that the first point cloud data set before normalization includes 10 frames of first point cloud data subsets and that the preset quantity of frames is 5 frames.

In an optional implementation, based on a time sequence, odd first point cloud data subsets in the first point cloud data set before normalization are selected as the first point cloud data set after normalization. FIG. 4f is a schematic diagram for data set normalization according to an embodiment of this application. The first point cloud data set before normalization includes {1, 2, 3, 4, 5, 6, 7, 8, 9, 10}, and {1, 3, 5, 7, 9} is selected as the first point cloud data set {0, 1, 2, 3, 4} after normalization, where {1} before normalization is used as {0} after normalization, {3} before normalization is used as {1} after normalization, {5} before normalization is used as {2} after normalization, {7} before normalization is used as {3} after normalization, and {9} before normalization is used as {4} after normalization.

When a relationship between the quantity of frames in the first point cloud data set before normalization and the preset quantity of frames is not an integer-multiple relationship, odd first point cloud data subsets in the first point cloud data set before normalization are selected as the first point cloud data set after normalization. In addition, a last (or penultimate) first point cloud data subset in the first point cloud data set before normalization is used as a last (or penultimate) first point cloud data subset in the first point cloud data set after normalization. For example, the quantity of frames in the first point cloud data set before normalization is 8, and the preset quantity of frames is 5. In this case, the first point cloud data set before normalization includes {1, 2, 3, 4, 5, 6, 7, 8}, and {1, 3, 5, 7, 8} is selected as the first point cloud data set {0, 1, 2, 3, 4} after normalization, where {1} before normalization is used as {0} after normalization, {3} before normalization is used as {1} after normalization, {5} before normalization is used as {2} after normalization, {7} before normalization is used as {3} after normalization, and {8} before normalization is used as {4} after normalization.

In another optional implementation, based on a time sequence, even first point cloud data subsets in the first point cloud data set before normalization are selected as the first point cloud data set after normalization. FIG. 4g is another schematic diagram for data set normalization according to an embodiment of this application. The first point cloud data set before normalization includes {1, 2, 3, 4, 5, 6, 7, 8, 9, 10}, and {2, 4, 6, 8, 10} is selected as the first point cloud data set {0, 1, 2, 3, 4} after normalization, where {2} before normalization is used as {0} after normalization, {4} before normalization is used as {1} after normalization, {6} before normalization is used as {2} after normalization, {8} before normalization is used as {3} after normalization, and {10} before normalization is used as {4} after normalization.

When a relationship between the quantity of frames in the first point cloud data set before normalization and the preset quantity of frames is not an integer-multiple relationship, even first point cloud data subsets in the first point cloud data set before normalization are selected as the first point cloud data set after normalization. In addition, a last first point cloud data subset in the first point cloud data set before normalization is used as a last first point cloud data subset in the first point cloud data set after normalization. For example, the quantity of frames in the first point cloud data set before normalization is 8, and the preset quantity of frames is 5. In this case, the first point cloud data set before normalization includes {1, 2, 3, 4, 5, 6, 7, 8}, and {2, 4, 6, 7, 8} is selected as the first point cloud data set {0, 1, 2, 3, 4} after normalization, where {2} before normalization is used as {0} after normalization, {4} before normalization is used as {1} after normalization, {6} before normalization is used as {2} after normalization, {7} before normalization is used as {3} after normalization, and {8} before normaliza-tion is used as {4} after normalization.

In another optional implementation, based on a time sequence, a union set of point cloud data in a plurality of frames of first point cloud data subsets in the first point cloud data set before normalization is used as point cloud data of one first point cloud data subset in the first point cloud data set after normalization; or point cloud data of one first point cloud data subset in the first point cloud data set before normalization is used as point cloud data of a plurality of frames of first point cloud data subsets in the first point cloud data set after normalization. For example, the first point cloud data set before normalization includes {1, 2, 3, 4, 5, 6, 7, 8, 9, 10}, and a union set of point cloud data included in {1, 2} before normalization is selected as point cloud data of {0} after normalization: a union set of point cloud data included in {3, 4} before normalization is used as point cloud data of {1} after normalization; a union set of point cloud data included in {5, 6} before normalization is used as point cloud data of {2} after normalization: a union set of point cloud data included in {7, 8} before normalization is used as point cloud data of {3} after normalization; and a union set of point cloud data included in {9, 10} before normalization is used as point cloud data of {4} after normalization.

Optionally, the first point cloud data set is normalized by using the following method:

$$\tilde{\varphi}_i = \bigcup_{j=0}^{j<\gamma} \varphi_k,$$

$$\gamma = \max(2, \lceil t/F \rceil),$$

$$\text{and } k = \max\left(0, \left\lceil (i+1) * \frac{t}{F} \right\rceil - j\right),$$

where $\tilde{\varphi}$ is the first point cloud data set after normalization, $\varphi$ is the first point cloud data set before normalization, $\tilde{\varphi}_i$ is an $i^{th}$ frame of first point cloud data subset in the first point cloud data set after normalization, $\varphi_k$ is a $k^{th}$ frame of point cloud data subset in the first point cloud data set before normalization, $\tilde{\varphi}_i$ includes a union set of point cloud data in $\gamma \varphi_k$s, t is a quantity of frames of point cloud data subsets in the original point cloud data set, and F is the preset quantity of frames. For ease of understanding, FIG. 4h is another schematic diagram for data set normalization according to an embodiment of this application. Using i=2 as an example, because t=10, and F=5, and j=0 or 1, k=5 and k=6 are determined by using the foregoing method. To be specific, point cloud data in a second frame (a second one of the first point cloud data subsets) in the first point cloud data set after normalization includes a union set of point cloud data in a fifth frame (a fifth one of the first point cloud data subsets) and point cloud data in a sixth frame (a sixth one of the first point cloud data subsets) in the first point cloud data set before normalization.

404. Perform gesture recognition based on a feature value of point cloud data in the first point cloud data set.

In this embodiment, after obtaining the first point cloud data set after normalization, the gesture recognition apparatus performs gesture recognition based on the feature value of the point cloud data in the first point cloud data set, where the feature value includes at least one of a coordinate value, a distance, a velocity, a horizontal angle, or a pitch angle of the point cloud data in a spatial coordinate system. The feature value may further include an amount of point cloud data, or the like. This is not limited herein.

Optionally, at least one of the following processing methods is performed on the feature value: variance processing, median processing, maximum/minimum value processing, or average value processing. For example:

Variance processing: Assuming that the feature value is a distance, variance processing is performed on distances of various point cloud data in the first point cloud data subset, and then gesture recognition is performed by using a variance of distances in each frame of first point cloud data subset.

Median processing: Assuming that the feature value is a velocity, median processing is performed on velocities of various point cloud data in the first point cloud data subset, that is, velocity values of various point cloud data in the first point cloud data subset are sorted, and a median of the velocity values is selected; and then gesture recognition is performed by using a median of velocities in each frame of first point cloud data subset.

Maximum/Minimum value processing: Assuming that the feature value is a coordinate value (an x-axis coordinate value) of the point cloud data in the spatial coordinate system, x-axis coordinate values of various point cloud data in the first point cloud data subset are sorted, and a maximum value or a minimum value of the x-axis coordinate values is selected; and then gesture recognition is performed by using a maximum value or a minimum value of x-axis coordinate values of the point cloud data in each frame of first point cloud data subset.

Average value processing: Assuming that the feature value is a horizontal angle, x-axis horizontal angles of various point cloud data in the first point cloud data subset are averaged, and then gesture recognition is performed by using an average value of the point cloud data in each frame of first point cloud data subset.

Optionally, normalization processing may be further performed on the feature value, and different normalization processing may be performed on different feature values. For example:

1. For the coordinate value, distance, velocity, horizontal angle, or pitch angle of the point cloud data in the spatial coordinate system, normalization processing is performed on the feature value by using a "z-score" standardization method. In some embodiments, the average value of the feature value is subtracted from the feature value of the point cloud data in each frame of first point cloud data subset, and then a remainder is divided by the feature value to obtain a standard deviation.

Optionally, normalization processing is performed by using the following method:

$$\tilde{x}_i = \frac{\tilde{x}_i - \mu_x}{\sigma_x},$$

where $\tilde{x}_i$ is a feature value after normalization, $\tilde{x}_i$ is a feature value before normalization, $\mu_x$ is an average value of the feature value in the first point cloud data subset, and $\sigma_x$ is a standard deviation of the feature value in the first point cloud data subset.

2. Velocity of point cloud data: An absolute value of a velocity of each piece of point cloud data in the first point cloud data subset is calculated. Then an average velocity value in the first point cloud data subset is calculated by using the absolute value. Finally, the velocity of each piece of point cloud data in the first point cloud data subset is divided by the average value.

Optionally, normalization processing is performed by using the following method:

$$\tilde{v}_i = \frac{\tilde{v}_i}{\mu_v},$$

where $\tilde{v}_i$ is a feature value after normalization, $\tilde{v}_i$ is a feature value before normalization, and $\mu_v$ is an average value of the feature value in the first point cloud data subset.

3. Amount of point cloud data: An amount of point cloud data in each frame of first point cloud data subset in the first point cloud data set is calculated. Then an average amount of point cloud data in various frames of first point cloud data subsets is calculated. Finally, the amount of point cloud data in each frame of first point cloud data subset is divided by the average value.

Optionally, normalization processing is performed by using the following method:

$$\bar{n}_i = \frac{\tilde{n}_i}{\mu_n},$$

where $\bar{n}_i$ is a feature value after normalization, $\tilde{n}_i$ is the amount of point cloud data in each frame of first point cloud data subset, and $\mu_n$ is the average amount of point cloud data in various frames of first point cloud data subsets.

It should be noted that the feature value may undergo variance processing, median processing, maximum/minimum value processing, or average value processing, and then gesture recognition is performed after normalization processing; or the feature value may undergo variance processing, median processing, maximum/minimum value processing, or average value processing only, and then gesture recognition is performed; or the feature value may undergo normalization processing only, and then gesture recognition is performed; or gesture recognition may be directly performed based on the feature value. This is not limited in this application.

The gesture recognition apparatus performs gesture recognition based on the feature value of the point cloud data in the first point cloud data set, and two different solutions may be selected: (1) Gesture recognition is performed by using a neural network model. (2) A similarity with the preset point cloud data set is calculated, and gesture recognition is performed based on the similarity. The following describes the solutions separately.

(1) Gesture recognition is performed by using a neural network model.

Figure 6:
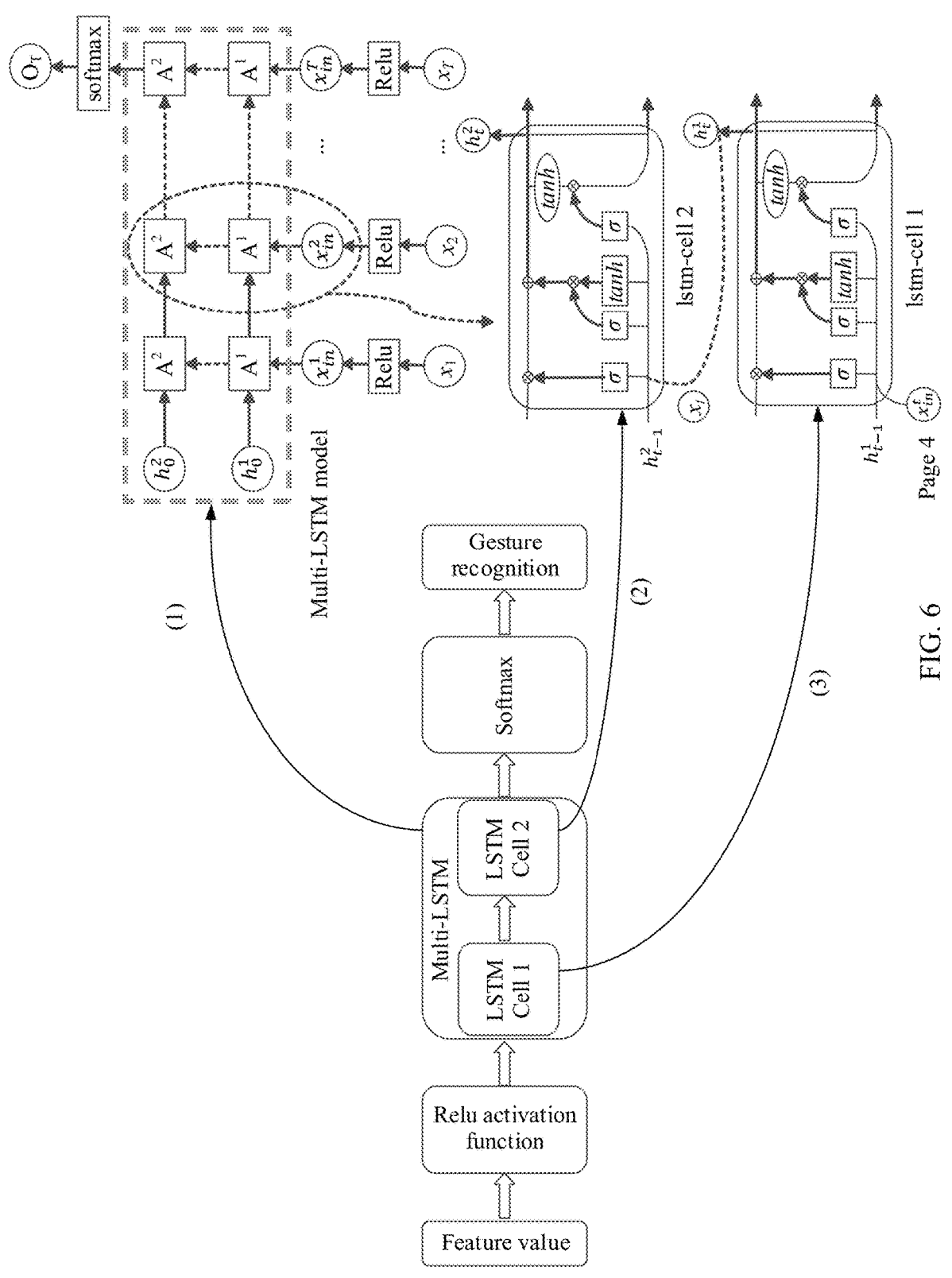
FIG. 6 is a schematic diagram for gesture recognition based on a neural network model according to an embodiment of this application.

The gesture recognition apparatus may perform gesture recognition by using a neural network model, where the neural network model may be a recurrent neural network (RNN), for example, a long short-term memory (LSTM) network, a bi-directional long short-term memory (Bi-LSTM) recurrent neural network, or a multi-layer long short-term memory (multi-LSTM) recurrent neural network. The following uses the multi-layer long short-term memory recurrent neural network as an example for description. FIG. 6 is a schematic diagram for gesture recognition based on a neural network model according to an embodiment of this application.

In FIG. 6, a vector set of m feature values of point cloud data in the first point cloud data set is "$\overline{\Phi_0}$", $\overline{\Phi_0}$ is used as an input of the multi-LSTM network, and the m feature values may be one or more feature values of the point cloud data. For example, when the feature values of the point cloud data include a coordinate value, a distance, and a velocity in a spatial rectangular coordinate system, the selected m feature values include a coordinate value $(x, y, z)$ and a velocity $(v)$ in the spatial rectangular coordinate system, that is, $m=4$. Alternatively, when the feature values of the point cloud data include a coordinate value, a distance, a velocity, and an acceleration in a spherical coordinate system, the selected m feature values include a coordinate value $(r, \theta, \varphi)$, a velocity $(v)$, and an acceleration $(a)$ in the spherical coordinate system, that is, $m=5$. $\overline{\Phi_0}$ is $m*T$, $T=20$ is duration of the first point cloud data set after normalization, $\overline{\Phi_0}=[\tilde{x}_1, \ldots, \tilde{x}_t, \ldots, \tilde{x}_T]$, and $\tilde{x}_t$ is a vector including $1*m$ columns of feature values.

Activation function: In the multi-LSTM network, the activation function is a rectified linear function (rectified linear unit, ReLU). The Relu activation function processes original data $\overline{\Phi_0}$ as follows:

$$x_{in}^t = \begin{cases} \tilde{x}_t w_{in} + b_{in}, & \text{if } w_{in}\tilde{x}_t \geq 0 \\ 0, & \text{if } w_{in}\tilde{x}_t < 0 \end{cases},$$

where $w_{in}$ is an $m*N_{in}$-dimensional variable, $b_{in}$ is a $1*N_{in}$-dimensional variable, $N_{in}$ is set to a quantity $N_{hidden}$ of hidden units in an LSTM, and $$x_{in}^t$$

is a $1*N_{in}$-dimensional tensor, $b_{in}$ and $w_{in}$ are variables gradually learned by the multi-LSTM network in gesture recognition processing. In some embodiments, the multi-LSTM network gradually adjusts $b_{in}$ and $w_{in}$ in gesture recognition processing by using an error back propagation (BP) algorithm.

Multi-LSTM network layer: As shown in (1) in FIG. 6, a dotted arrow indicates that more layers can be added to an LSTM network. Using a two-layer LSTM network as an example, $A^1$ is an LSTM-Cell 1, $A^2$ is an LSTM-Cell 2, an input of the LSTM-Cell 1 is $$x_{in}^t,$$

and an input of the LSTM-Cell 2 may be an output $$h_t^1$$

of the LSTM-Cell 1 or may be weighted linear transformation of $$h_t^1.$$

In this embodiment, assuming that $$h_t^1$$

is an input of the LSTM-Cell 2, duration is $N_{step}=T=F=20$, and quantities of hidden units in the two LSTM-Cells may be the same or different. Herein, it is assumed that a same quantity $N_{hidden}=16$ is set.

Softmax layer: As shown in (2) and (3) in FIG. 6, a final output of the multi-LSTM network is a result obtained after weighting and softmax are performed on $$h_t^2$$

that is output by the LSTM-Cell 2 at a last time T, that is, $$o_T = softmax\left(w_{out}h_t^2 + b_{out}\right),$$

where or is a $N_{class}$*1-dimensional vector, $w_{out}$ is an $N_{class}$*$N_{hidden}$-dimensional variable, $b_{out}$ is an $N_{class}$*1-dimensional variable, $$h_t^2$$

is an $N_{hidden}$*1-dimensional tensor, and $N_{class}$ is a quantity of gesture types.

Gesture discrimination: $o_T$ is an output of the multi-LSTM network, and its format is a one-hot coding (one-hot) mode, such as [0, 0, . . . , 1, . . . , 0], that is, an $N_{class}$-dimensional vector, where a $k^{th}$ value is 1, and other values are 0, indicating that a recognized gesture is a $k^{th}$ gesture predefined in a model training process. An example is shown in Table 2.

TABLE 2

| Predefined gesture | One-hot code |
|---|---|
| Waving up | [1, 0, 0, 0, 0, 0] |
| Waving down | [0, 1, 0, 0, 0, 0] |
| Waving to the left | [0, 0, 1, 0, 0, 0] |
| Waving to the right | [0, 0, 0, 1, 0, 0] |
| Circling | [0, 0, 0, 0, 1, 0] |
| Waving forward | [0, 0, 0, 0, 0, 1] |

A gesture corresponding to the current first point cloud data set may be recognized through processing of the neural network model.

(2) A similarity with the preset point cloud data set is calculated, and gesture recognition is performed based on the similarity.

In some embodiments, a similarity between the first point cloud data set and the preset point cloud data set is calculated in a dynamic time planning manner or a vector cosine manner, and gesture recognition is performed based on the similarity.

A quantity of preset point cloud data sets is not limited herein. The preset point cloud data sets may be one or more preset point cloud data sets, and each preset point cloud data set corresponds to one predefined gesture. For example, a preset point cloud data set A corresponds to waving to the right, a preset point cloud data set B corresponds to waving to the left, and a preset point cloud data set C corresponds to circling counterclockwise. The gesture recognition apparatus calculates the similarity between the first point cloud data set and the preset point cloud data set, and performs gesture recognition based on the similarity. For example, as shown in Table 3, it is determined that the gesture of the first point cloud data set is circling counterclockwise.

TABLE 3

| Predefined gesture (preset point cloud data set) | Similarity |
|---|---|
| Waving to the left | 12.5% |
| Waving to the right | 18.2% |
| Circling counterclockwise | 92.3% |

Dynamic time planning manner: First, a feature value of the first point cloud data set is obtained, and a feature value of the preset point cloud data set is obtained. Then a minimum cumulative distance value between the two feature values (respectively used as two vectors) is obtained by using an optimal normalization function, and the value is used as the similarity between the first point cloud data set and the preset point cloud data set.

Vector cosine manner: First, a feature value of the first point cloud data set is obtained, and a feature value of the preset point cloud data set is obtained. Then the two feature values are used as two vectors, a cosine value between the two vectors is calculated, and the cosine value is used as the similarity between the first point cloud data set and the preset point cloud data set.

Figure 5A:
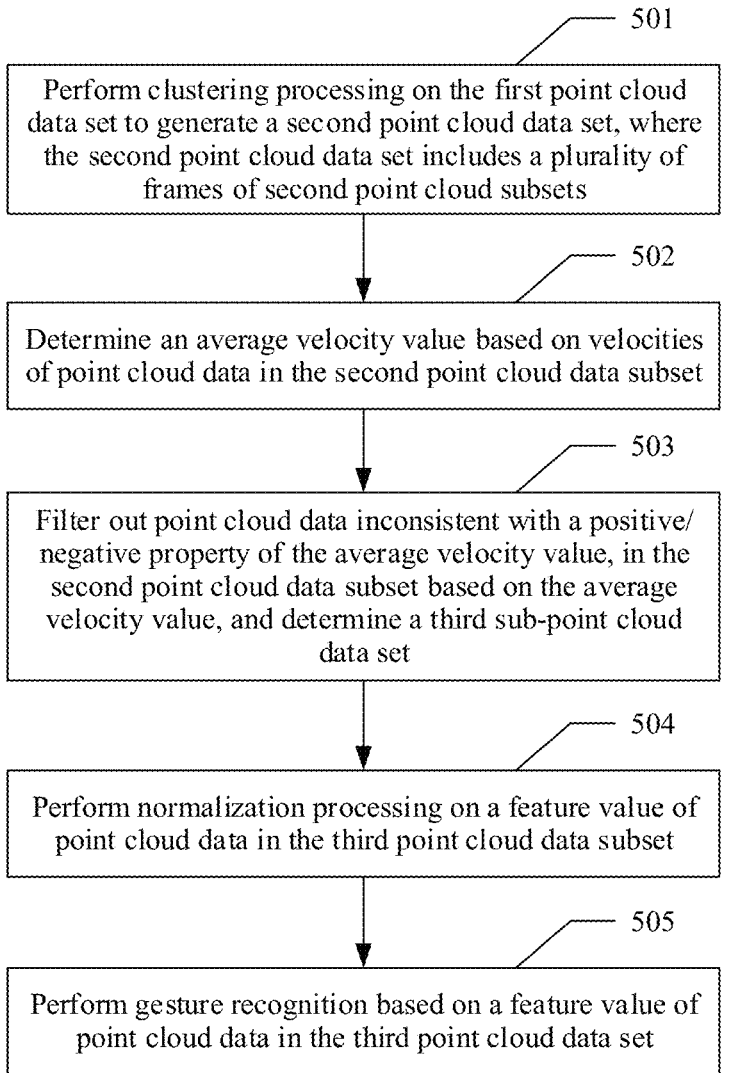
FIG. 5a is a schematic flowchart for filtering a first point cloud data set according to an embodiment of this application.

In some embodiments, for a detailed step of performing gesture recognition based on the feature value of the point cloud data in the first point cloud data set, refer to an embodiment shown in FIG. 5a.

In this embodiment of this application, the original point cloud data set is filtered to obtain the first point cloud data set. The first point cloud data set includes a plurality of frames of first point cloud data subsets, each frame of first point cloud data subset corresponds to one frame in the first point cloud data set, and the first point cloud data subsets are continuous in time. The maximum horizontal distance between any two first cluster centers in the first point cloud data set meets the first preset condition, and duration corresponding to the plurality of frames of first point cloud data subsets meets the first preset condition. Finally, gesture recognition is performed by using the feature value of the point cloud data in the first point cloud data set. A location change track of the first cluster center may be considered as a moving track of a detection target. Duration corresponding to a plurality of continuous first point cloud data subsets may be considered as moving duration of the detection target. Therefore, filtering can be performed on the original point cloud data set to effectively filter out a point cloud data set corresponding to an excessively large or excessively small moving track and filter out a point cloud data set corresponding to excessively long or excessively short moving duration. Point cloud data included in the point cloud data sets that are filtered out is invalid data. Then gesture recognition is performed by using the filtered point cloud data set. In this way, a probability of unintentional triggering is reduced, and man-machine interaction experience of the user is improved. Speeds of hand actions performed by different individuals are different. For example, Zhang San spends 0.8 second in drawing a circle with a right hand, and Li Si spends 1.2 seconds in drawing a circle with a right hand. Due to different time consumption, duration corresponding to different point cloud data sets also varies, and this causes difficulty in recognition. Duration of first point cloud data sets generated by different individuals is normalized to the preset quantity of frames by performing normalization processing on the first point cloud data sets. Therefore, difficulty in gesture recognition is reduced, and accuracy of gesture recognition is improved. Normalization processing is performed on the feature value of the point cloud data in the first point cloud data set, so that a generalization capability of the gesture recognition apparatus can be effectively improved and that the gesture recognition apparatus can adapt to scenarios with different groups of people, different gesture amplitudes, and different distance spaces.

Next, some content in the embodiment shown in FIG. 4a is further described separately.

Step 402: (1) How to filter the original point cloud data set to obtain the first point cloud data set.

Step 404: (2) Various point cloud data in the first point cloud data set is further processed, and gesture recognition is performed by using a feature value of the processed point cloud data.

(1) How to filter the original point cloud data set to obtain the first point cloud data set.

FIG. 4*b* is a schematic flowchart for filtering an original point cloud data set according to an embodiment of this application.

S1. Filter out micro-motion point cloud data in the original point cloud data set.

In step S1, as the human body normally breathes, the chest undulates, and reflected signals generated by radiation of radar signals on the chest are also recorded in a form of point cloud data in the original point cloud data set. Similarly, the human body cannot be completely motionless. When the human body shakes slightly, a location change of the human body is also recorded in the form of point cloud data in the point cloud data set. This type of point cloud data irrelevant to a hand action is referred to as "micro-motion point cloud data" in this embodiment of this application.

To avoid adverse impact of the micro-motion point cloud data on subsequent gesture recognition, the micro-motion point cloud data needs to be filtered out from the original point cloud data set. In some embodiments, a first threshold is set, the point cloud data is filtered out from the original point cloud data set by using the first threshold, and all point cloud data whose velocity is less than or equal to the first threshold is filtered out from the original point cloud data set. Optionally, the first threshold is 0.15 meter per second or 0.10 meter per second.

Figure 4C:
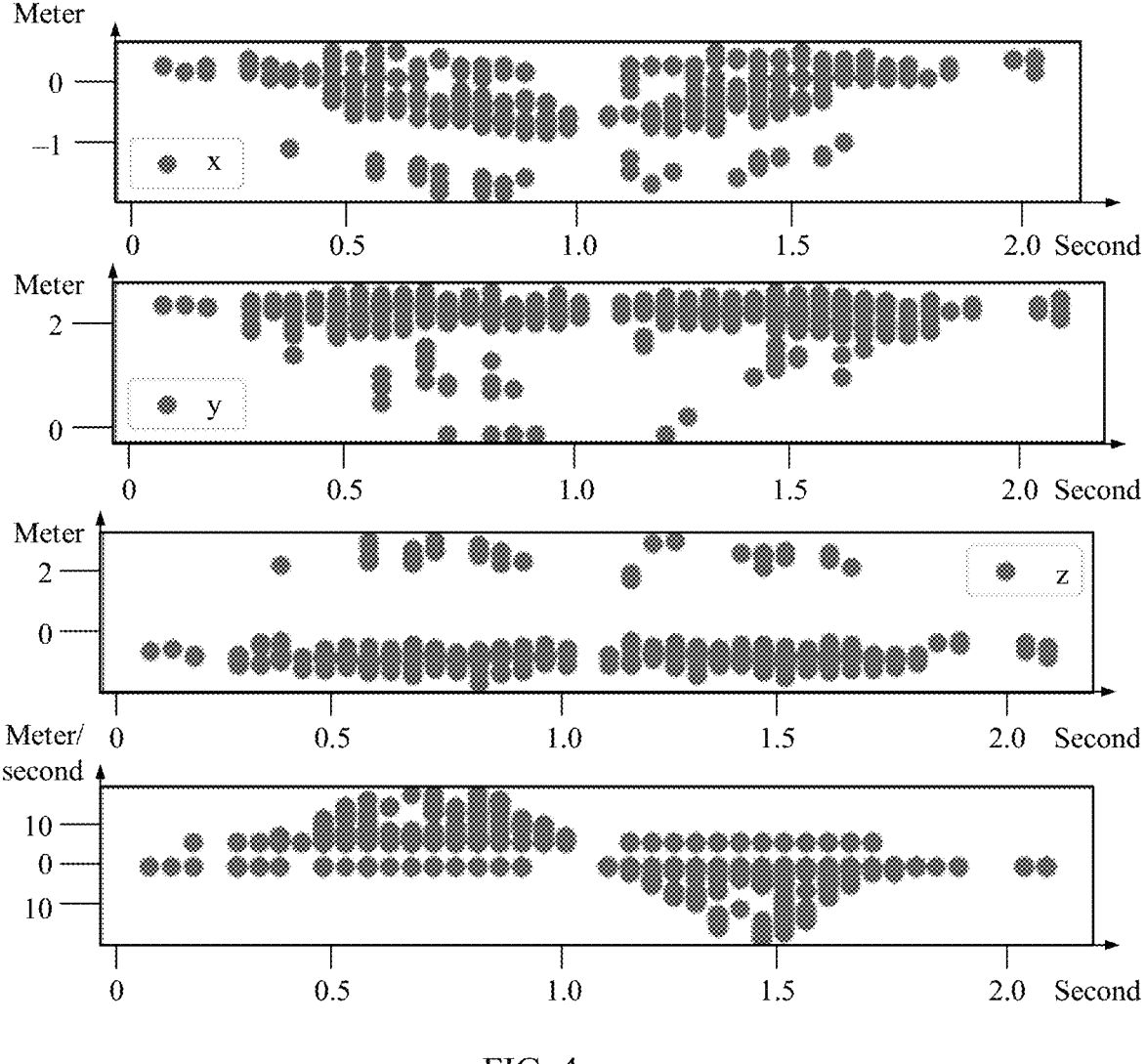
FIG. 4c is a schematic diagram of point cloud data according to an embodiment of this application.

For ease of understanding, FIG. 4*c* is a schematic diagram of point cloud data according to an embodiment of this application. FIG. 4*c* schematically shows an original point cloud data set in which micro-motion point cloud data is not filtered out. Feature values of point cloud data in each frame in the original point cloud data set are respectively an x-axis coordinate value, ay-axis coordinate value, a z-axis coordinate value, and a velocity value from top to bottom.

S2. Determine, based on a horizontal distance between a cluster center at a current time and a cluster center at an initial time, whether point cloud data at the current time belongs to the first point cloud data set.

In step S2, the first preset condition limits both the duration of the first point cloud data set and the maximum horizontal distance between any two first cluster centers in the first point cloud data set.

Therefore, a time is first selected from the original point cloud data set as the initial time, as follows: In step S1, the micro-motion point cloud data has been filtered out from the original point cloud data set. To ensure that actions corresponding to the first point cloud data set are continuous, the original point cloud data set processed in step S1 needs to be further filtered. A point cloud data subset whose duration between two adjacent frames in the original point cloud data set is greater than or equal to a second threshold is filtered out. The remaining original point cloud data set includes one or more fourth point cloud data subsets formed by continuous point cloud data subsets. Blank duration before a first frame in each segment of fourth point cloud data subset is greater than or equal to the second threshold, the blank duration is duration without a fourth point cloud data subset, and blank duration after a last frame is greater than or equal to the second threshold. The second threshold may be 0.5 second.

Then the fourth point cloud data subset is further filtered, so that a fourth point cloud data subset of excessively long or excessively short duration is filtered out. After the filtering is completed, duration of each fourth point cloud data subset in the original point cloud data set meets the first preset condition.

Then a first frame in each fourth point cloud data subset is selected as an initial time, and a remaining frame is used as a current time. A cluster center of each frame is calculated. For an optional clustering method, refer to the foregoing embodiment. Details are not described herein again.

Whether point cloud data at the current time belongs to the first point cloud data set is determined, based on a horizontal distance between a cluster center at the current time and a cluster center at the initial time. In some embodiments, when a maximum horizontal distance between any two cluster centers in the fourth point cloud data subset does not meet the first preset condition, the fourth point cloud data subset is filtered out from the original point cloud data set.

Figure 4D:
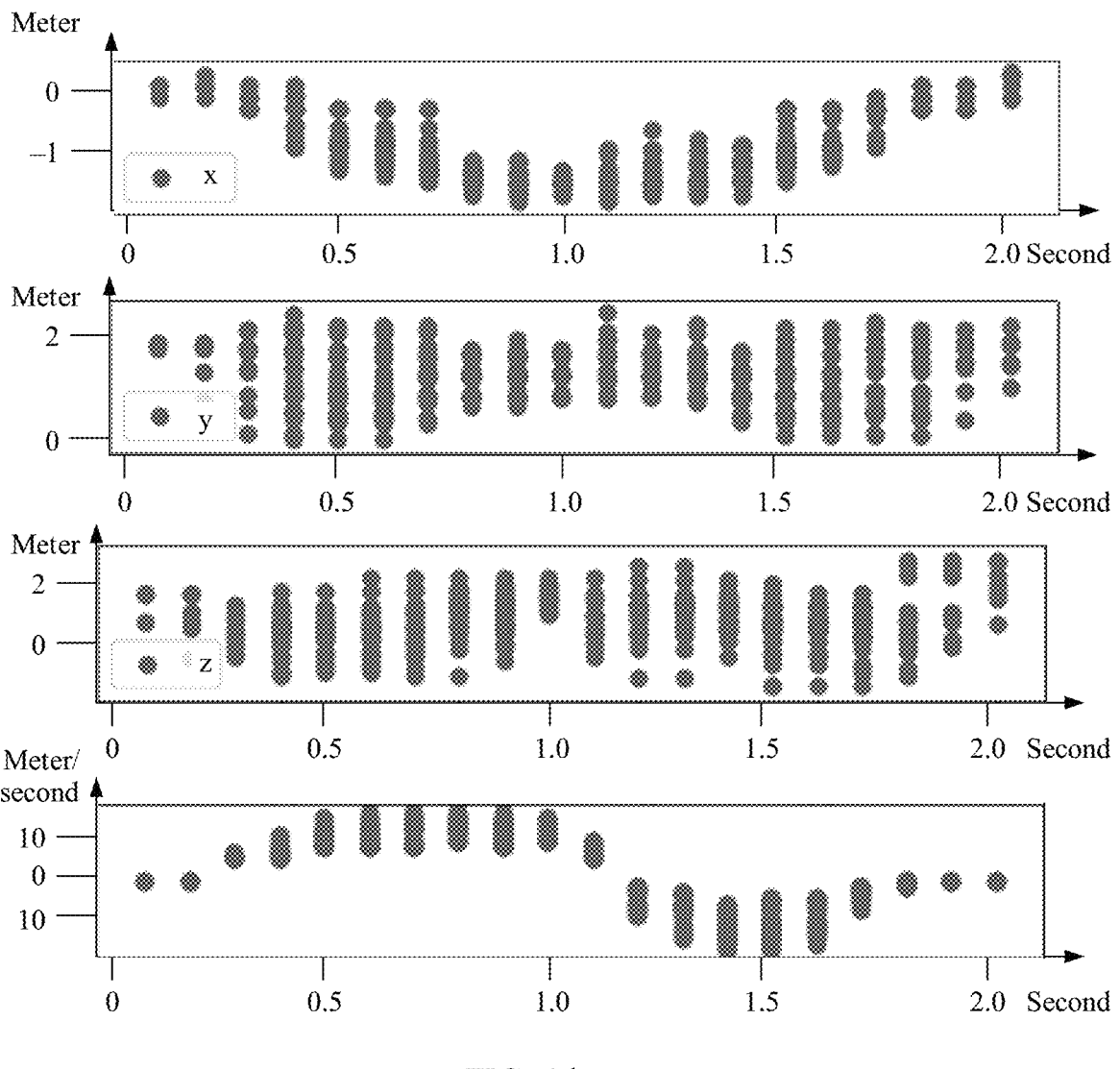
FIG. 4d is another schematic diagram of point cloud data according to an embodiment of this application.
Figures 4E, 4F:
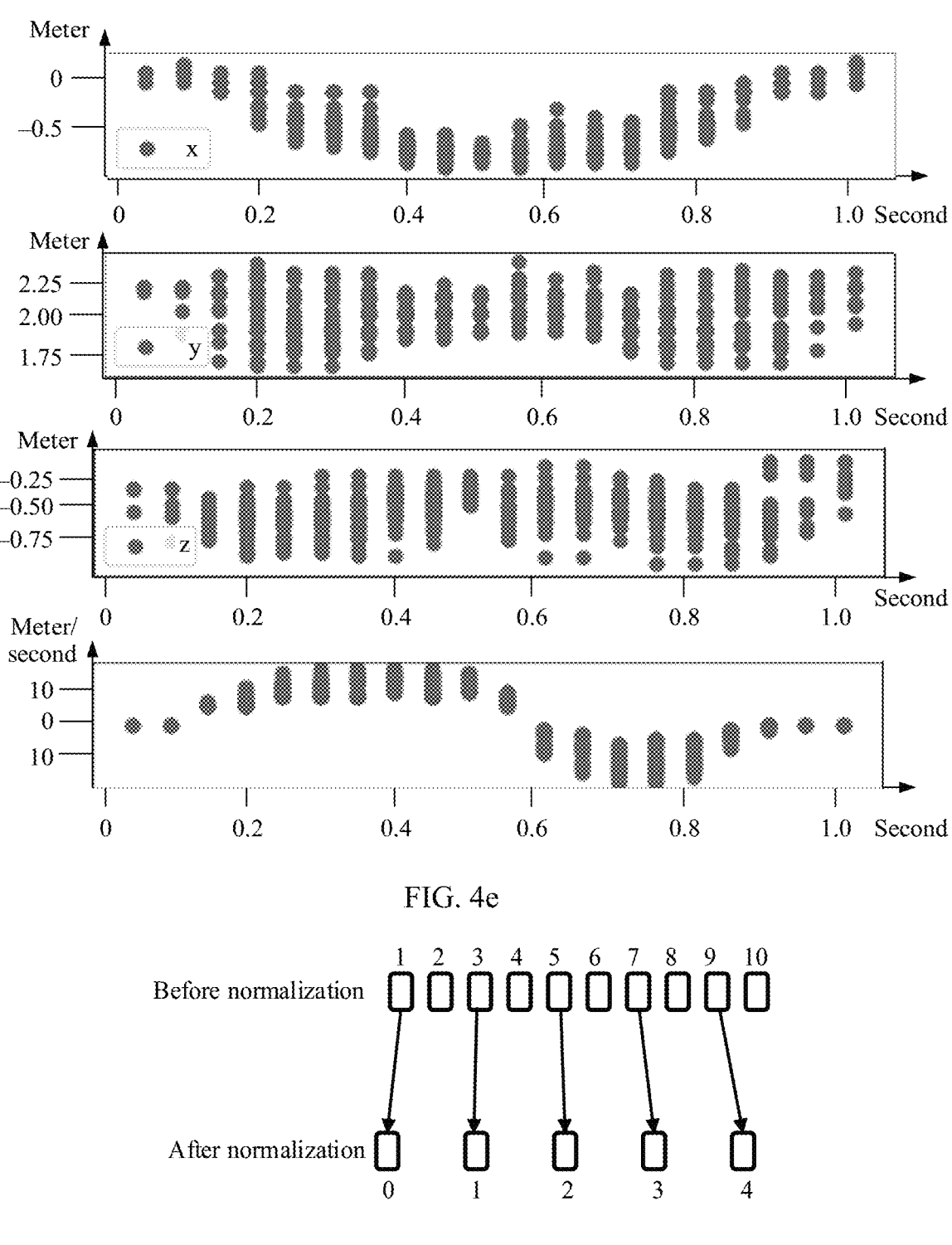
FIG. 4e is another schematic diagram of point cloud data according to an embodiment of this application.
FIG. 4f is a schematic diagram for data set normalization according to an embodiment of this application.
Figures 4G, 4H:
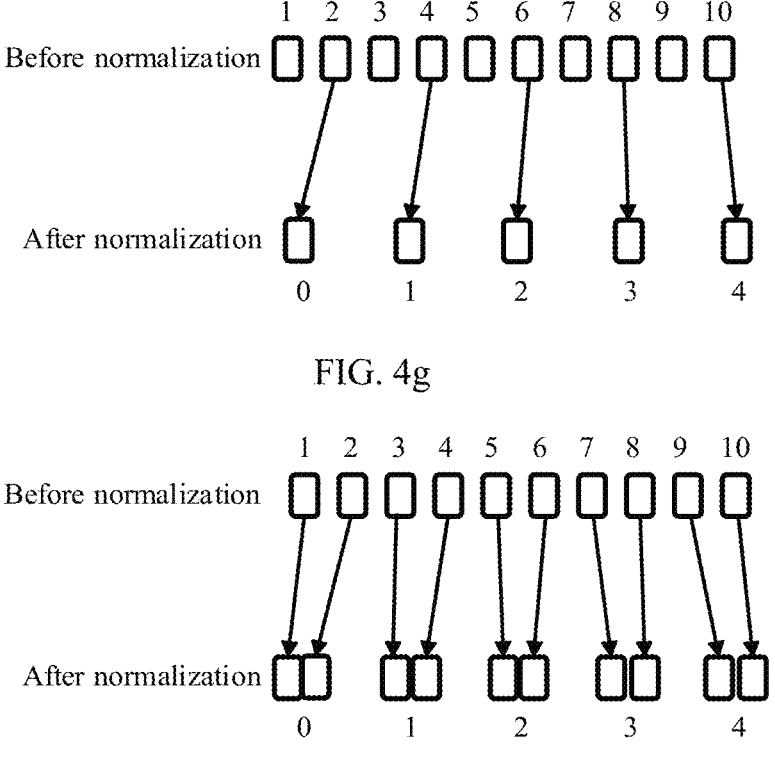
FIG. 4g is another schematic diagram for data set normalization according to an embodiment of this application.
FIG. 4h is another schematic diagram for data set normalization according to an embodiment of this application.

Finally, the remaining original point cloud data set is output as the first point cloud data set. The first point cloud data set is shown in FIG. 4*d*. FIG. 4*d* is another schematic diagram of point cloud data according to an embodiment of this application. By comparing FIG. 4*c* with FIG. 4*d*, it can be visually learned that disordered point cloud data has been effectively filtered out.

(2) Various point cloud data in the first point cloud data set is further processed, and gesture recognition is performed by using a feature value of the processed point cloud data.

FIG. 5*a* is a schematic flowchart for filtering a first point cloud data set according to an embodiment of this application.

Step 501: Perform clustering processing on the first point cloud data set to generate a second point cloud data set, where the second point cloud data set includes a plurality of frames of second point cloud data subsets.

In step 501, the gesture recognition apparatus performs clustering processing on the first point cloud data set normalized in step 403. For ease of understanding, FIG. 4*d* is the first point cloud data set before normalization, and the first point cloud data after normalization is shown in FIG. 4*e*. FIG. 4*e* is another schematic diagram of point cloud data according to an embodiment of this application.

Clustering processing is performed on each frame in the normalized first point cloud data set to generate the second point cloud data set. In some embodiments, clustering processing is performed on a subclass with a largest amount of point cloud data in each frame. For example, a fifth frame in the first point cloud data set includes three subclasses, and each subclass includes several pieces of point cloud data. In this case, a subclass with a largest amount of point cloud data is selected as point cloud data of a fifth frame in the second point cloud data set, and then clustering processing is performed on the subclass. A resulting cluster center is referred to as a second cluster center.

The second point cloud data set includes a plurality of frames of second point cloud data subsets, the second point cloud data subset is a subclass with a largest quantity of point clouds after clustering in a corresponding first point cloud data subset, the second point cloud data subset includes a second cluster center, and a bounding box size of the second cluster center is less than or equal to a bounding box size of the first cluster center.

Step 502: Determine an average velocity value based on velocities of various point cloud data in the second point cloud data subset.

In step 502, the average velocity value is determined based on the velocities of various point cloud data in the second point cloud data subset. For example, the second point cloud data set includes five frames, and velocities of all point cloud data in the five frames of second point cloud data subsets are averaged.

Step 503: Filter out point cloud data inconsistent with a positive/negative property of the average velocity value, in the second point cloud data subset based on the average velocity value, and determine a third point cloud data subset.

In step 503, the point cloud data inconsistent with the positive/negative property of the average velocity value, in the second point cloud data subset, is filtered out based on the average velocity value, and the third point cloud data subset is determined, where the velocity of each point cloud in the third point cloud data subset is consistent with the positive/negative property of the average velocity value. A third point cloud data set includes a plurality of such third point cloud data subsets, and a quantity of frames in the third point cloud data set is consistent with a quantity of frames in the second point cloud data set.

Step 504: Perform normalization processing on a feature value of point cloud data in the third point cloud data subset.

Figure 5B:
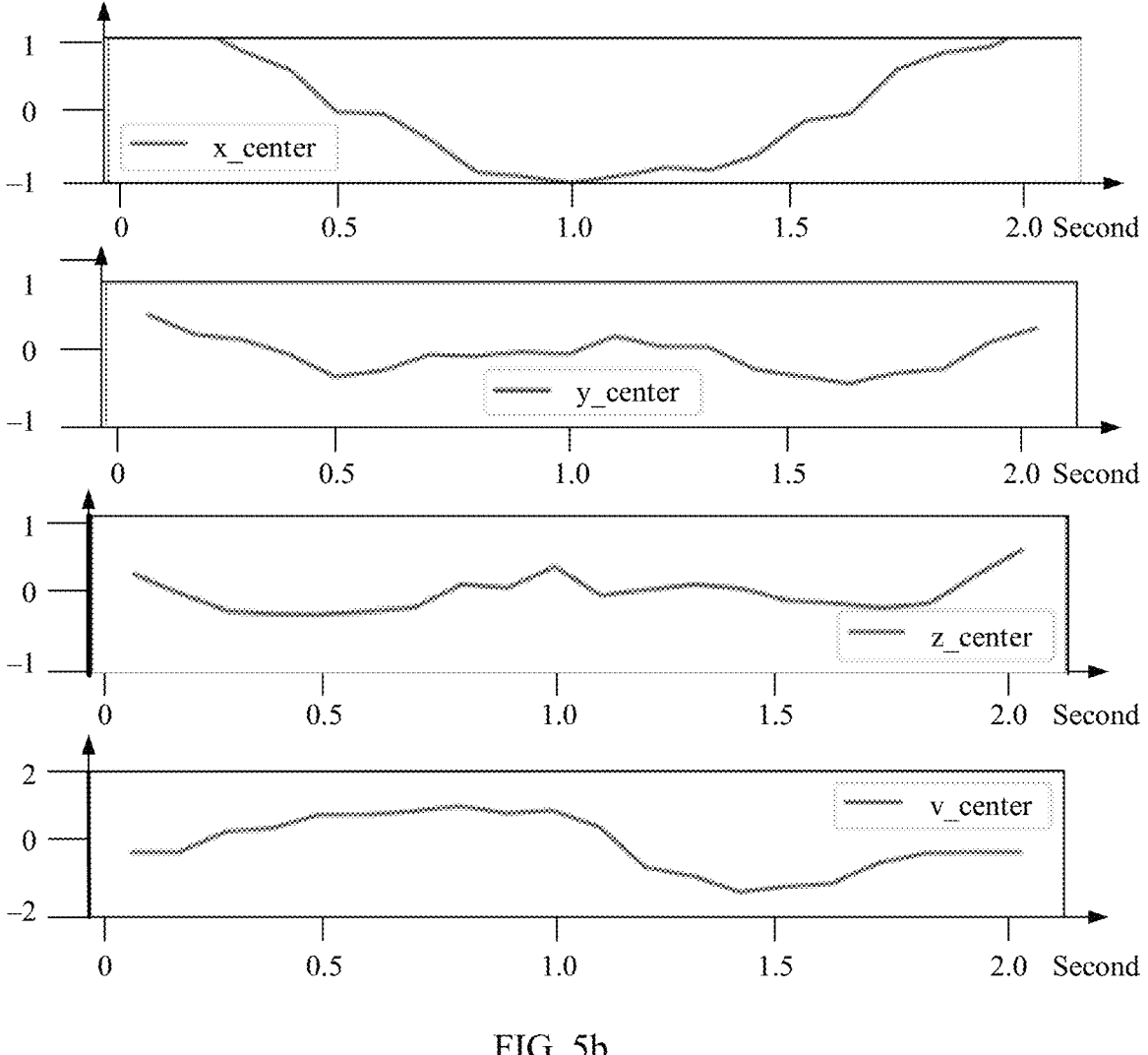
FIG. 5b is another schematic diagram of point cloud data according to an embodiment of this application.

In step 504, normalization processing is performed on the feature value of point cloud data in the third point cloud data subset. A specific normalization processing method is similar to the foregoing step 404. Details are not described herein again. For ease of understanding, for the third point cloud data set after normalization processing, refer to FIG. 5b. FIG. 5b is another schematic diagram of point cloud data according to an embodiment of this application. By comparing FIG. 4d with FIG. 5b, a change rule of point cloud data can be obtained visually.

Step 505: Perform gesture recognition based on a feature value of point cloud data in the third point cloud data set.

Step 505 is similar to step 404. Details are not described herein again.

In this embodiment of this application, the first point cloud data set is further filtered and processed, so that the point cloud data on which gesture recognition is finally performed better matches a real hand action of the human body. Therefore, accuracy of gesture recognition can be effectively improved.

The foregoing mainly describes the solutions provided in embodiments of this application from the perspective of the methods. It may be understood that, to implement the foregoing functions, the gesture recognition apparatus includes a corresponding hardware structure and/or software module for performing each function. A person of ordinary skill in the art should easily be aware that, in combination with the examples described in embodiments disclosed in this specification, modules, algorithms and steps may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the gesture recognition apparatus may be divided into functional modules based on the foregoing method examples. For example, the functional modules may be obtained through division in a one-to-one correspondence with the functions, or two or more functions may be integrated into one processing module 702. The integrated module may be implemented in a form of hardware, or may be implemented in a form of a software functional module. It should be noted that, in embodiments of this application, division into the modules is an example and is merely logical function division, and may be other division in an actual implementation.

Figure 7:
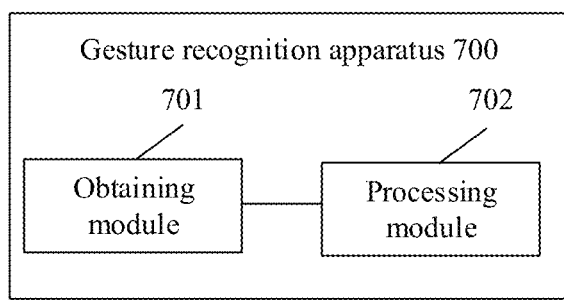
FIG. 7 is a schematic diagram of an embodiment of a gesture recognition apparatus according to an embodiment of this application.

The following describes in detail a gesture recognition apparatus in this application. FIG. 7 is a schematic diagram of an embodiment of a gesture recognition apparatus according to an embodiment of this application. The gesture recognition apparatus 700 includes:

an obtaining module 701, configured to obtain an original point cloud data set, where the original point cloud data set includes a plurality of pieces of point cloud data, the plurality of pieces of point cloud data correspond to a plurality of reflected signals, and the reflected signals correspond to radar signals transmitted by a radar apparatus; and a processing module 702, configured to filter the original point cloud data set to obtain a first point cloud data set, where the first point cloud data set includes a plurality of frames of first point cloud data subsets, each frame of first point cloud data subset corresponds to one frame in the first point cloud data set, the plurality of first point cloud data subsets are continuous in time, the first point cloud data subset includes a first cluster center, the first cluster center is a cluster center of a plurality of pieces of point cloud data in the first point cloud data subset, a maximum horizontal distance between any two first cluster centers meets a first preset condition, and duration of the first point cloud data set meets the first preset condition, where the processing module 702 is further configured to perform gesture recognition based on a feature value of point cloud data in the first point cloud data set, where the feature value includes at least one of a coordinate value, a distance, a velocity, a horizontal angle, or a pitch angle of the point cloud data in a spatial coordinate system.

In some embodiments of this application, the processing module 702 is configured to perform clustering processing on the first point cloud data set to generate a second point cloud data set, where the second point cloud data set includes a plurality of frames of second point cloud data subsets, the second point cloud data subset is a subclass with a largest amount of point cloud data after clustering in a corresponding first point cloud data subset, the second point cloud data subset includes a second cluster center, and a bounding box size of the second cluster center is less than or equal to a bounding box size of the first cluster center; and the processing module 702 is configured to perform gesture recognition based on a feature value of point cloud data in the second point cloud data set.

In some embodiments of this application, the processing module 702 is configured to: based on a time sequence of the first point cloud data set, select a union set of point cloud data in a plurality of frames of first point cloud data subsets in the first point cloud data set before normalization as point cloud data of one first point cloud data subset in the first point cloud data set after normalization; or select point cloud data of one first point cloud data subset in the first point cloud data set before normalization as point cloud data of a plurality of frames of first point cloud data subsets in the first point cloud data set after normalization.

In some embodiments of this application, the processing module 702 is further configured to normalize the first point cloud data set when a quantity of frames in the first point cloud data set is inconsistent with a preset quantity of frames, where the quantity of frames in the first point cloud data set before normalization is expanded or decreased to the preset quantity of frames, a quantity of frames in the first point cloud data set after normalization is the preset quantity of frames, and the preset quantity of frames is determined by a frame rate of the radar signals transmitted by the radar apparatus.

In some embodiments of this application, the processing module 702 is configured to normalize the first point cloud data set by using the following method:

$$\tilde{\varphi}_i = \bigcup\nolimits_{j=0}^{j<\gamma} \varphi_k,$$

$$\gamma = \max(2, \lceil t/F \rceil),$$

$$\text{and} \quad k = \max\left(0, \left\lceil (i+1) * \frac{t}{F} \right\rceil - j\right),$$

where $\tilde{\varphi}$ is the first point cloud data set after normalization, $\varphi$ is the first point cloud data set before normalization, $\tilde{\varphi}_i$ is an $i^{th}$ frame of first point cloud data subset in the first point cloud data set after normalization, $\varphi_k$ is a $k^{th}$ frame of first point cloud data subset in the first point cloud data set before normalization, $\varphi_i$ includes a union set of point cloud data in $\gamma \varphi_k$s, t is a quantity of frames in the first point cloud data set before normalization, and F is the preset quantity of frames.

In some embodiments of this application, the processing module 702 is configured to determine an average velocity value based on velocities of various point cloud data in the second point cloud data subset:

the processing module 702 is configured to filter out point cloud data inconsistent with a positive/negative property of the average velocity value, in the second point cloud data subset based on the average velocity value, and determine a third point cloud data subset, where a velocity of each point cloud in the third point cloud data subset is consistent with the positive/negative property of the average velocity value; and the processing module 702 is configured to perform gesture recognition based on a feature value of each piece of point cloud data in a third point cloud data set, where the third point cloud data set includes a plurality of such third point cloud data subsets, and a quantity of third point cloud data subsets is consistent with a quantity of second point cloud data subsets in the second point cloud data set.

In some embodiments of this application, a velocity of the point cloud data in the first point cloud data set is greater than a first threshold, and duration between two continuous frames of first point cloud data subsets in the first point cloud data set is less than a second threshold.

In some embodiments of this application, the feature value undergoes variance processing, median processing, maximum/minimum value processing, or average value processing.

In some embodiments of this application, the feature value undergoes normalization processing.

In some embodiments of this application, the processing module 702 is configured to process the feature value of each piece of point cloud data in the first point cloud data set by using a neural network model, and then perform gesture recognition, where the neural network model includes a recurrent neural network.

In some embodiments of this application, the processing module 702 is configured to perform similarity calculation based on the feature value of each piece of point cloud data in the first point cloud data set and a preset point cloud data set; and the processing module 702 is configured to determine, based on a similarity calculation result, a gesture corresponding to the first point cloud data set.

In some embodiments of this application, the first preset condition is as follows: The maximum horizontal distance between any two first cluster centers is less than a third threshold, and duration corresponding to the duration of the first point cloud data set is less than a fourth threshold and greater than a fifth threshold.

This application provides a radar apparatus, including a radar antenna and a processor, where the processor is communicatively connected to the radar antenna, and the radar antenna is configured to send a plurality of radar signals, receive a plurality of reflected signals of the plurality of radar signals, and transmit the plurality of reflected signals to the processor:

the processor is configured to obtain an original point cloud data set, where the original point cloud data set includes a plurality of pieces of point cloud data, the plurality of pieces of point cloud data correspond to a plurality of reflected signals, and the reflected signals correspond to radar signals transmitted by a radar apparatus; the processing module is configured to filter the original point cloud data set to obtain a first point cloud data set, where the first point cloud data set includes a plurality of frames of first point cloud data subsets, each frame of first point cloud data subset corresponds to one frame in the first point cloud data set, the plurality of first point cloud data subsets are continuous in time, the first point cloud data subset includes a first cluster center, the first cluster center is a cluster center of a plurality of pieces of point cloud data in the first point cloud data subset, a maximum horizontal distance between any two first cluster centers meets a first preset condition, and duration of the first point cloud data set meets the first preset condition; and the processor is further configured to perform gesture recognition based on a feature value of point cloud data in the first point cloud data set, where the feature value includes at least one of a coordinate value, a distance, a velocity, a horizontal angle, or a pitch angle of the point cloud data in a spatial coordinate system.

The processor is configured to perform clustering processing on the first point cloud data set to generate a second point cloud data set, where the second point cloud data set includes a plurality of frames of second point cloud data subsets, the second point cloud data subset is a subclass with a largest amount of point cloud data after clustering in a corresponding first point cloud data subset, the second point cloud data subset includes a second cluster center, and a bounding box size of the second cluster center is less than or equal to a bounding box size of the first cluster center; and the processor is configured to perform gesture recognition based on a feature value of point cloud data in the second point cloud data set.

The processor is further configured to normalize the first point cloud data set when a quantity of frames in the first point cloud data set is inconsistent with a preset quantity of frames, where the quantity of frames in the first point cloud data set before normalization is expanded or decreased to the preset quantity of frames, a quantity of frames in the first point cloud data set after normalization is the preset quantity of frames, and the preset quantity of frames is determined by a frame rate of the radar signals transmitted by the radar apparatus.

The processor is configured to: based on a time sequence of the first point cloud data set, select a union set of point cloud data in a plurality of frames of first point cloud data subsets in the first point cloud data set before normalization as point cloud data of one first point cloud data subset in the first point cloud data set after normalization; or > select point cloud data of one first point cloud data subset in the first point cloud data set before normalization as point cloud data of a plurality of frames of first point cloud data subsets in the first point cloud data set after normalization.

The processor is configured to normalize the first point cloud data set by using the following method:

$$\tilde{\varphi}_i = \bigcup_{j=0}^{j<\gamma} \varphi_k,$$

$$\gamma = \max(2, \lceil t/F \rceil),$$

$$\text{and } k = \max\left(0, \left\lceil (i+1) * \frac{t}{F} \right\rceil - j\right),$$

where $\tilde{\varphi}$ is the first point cloud data set after normalization, $\varphi$ is the first point cloud data set before normalization, $\tilde{\varphi}_i$ is an $i^{th}$ frame of first point cloud data subset in the first point cloud data set after normalization, $\varphi_k$ is a $k^{th}$ frame of first point cloud data subset in the first point cloud data set before normalization, $\tilde{\varphi}_i$ includes a union set of point cloud data in Y OKS, t is a quantity of frames in the first point cloud data set before normalization, and F is the preset quantity of frames.

The processor is configured to determine an average velocity value based on velocities of various point cloud data in the second point cloud data subset; the processor is configured to filter out point cloud data inconsistent with a positive/negative property of the average velocity value, in the second point cloud data subset based on the average velocity value, and determine a third point cloud data subset, where a velocity of each point cloud in the third point cloud data subset is consistent with the positive/negative property of the average velocity value; and the processor is configured to perform gesture recognition based on a feature value of each piece of point cloud data in a third point cloud data set, where the third point cloud data set includes a plurality of such third point cloud data subsets, and a quantity of third point cloud data subsets is consistent with a quantity of second point cloud data subsets in the second point cloud data set.

Optionally, a velocity of the point cloud data in the first point cloud data set is greater than the first threshold, and duration between two continuous frames of first point cloud data subsets in the first point cloud data set is less than the second threshold.

Optionally, the feature value undergoes variance processing, median processing, maximum/minimum value processing, or average value processing.

Optionally, the feature value undergoes normalization processing.

The processor is configured to process the feature value of each piece of point cloud data in the first point cloud data set by using a neural network model, and then perform gesture recognition, where the neural network model includes a recurrent neural network.

The processor is configured to perform similarity calculation based on the feature value of each piece of point cloud data in the first point cloud data set and a preset point cloud data set; and the processor is configured to determine, based on a similarity calculation result, a gesture corresponding to the first point cloud data set.

Optionally, the first preset condition is as follows: The maximum horizontal distance between any two first cluster centers is less than a third threshold, and duration corresponding to the duration of the first point cloud data set is less than a fourth threshold and greater than a fifth threshold.

Figure 8:
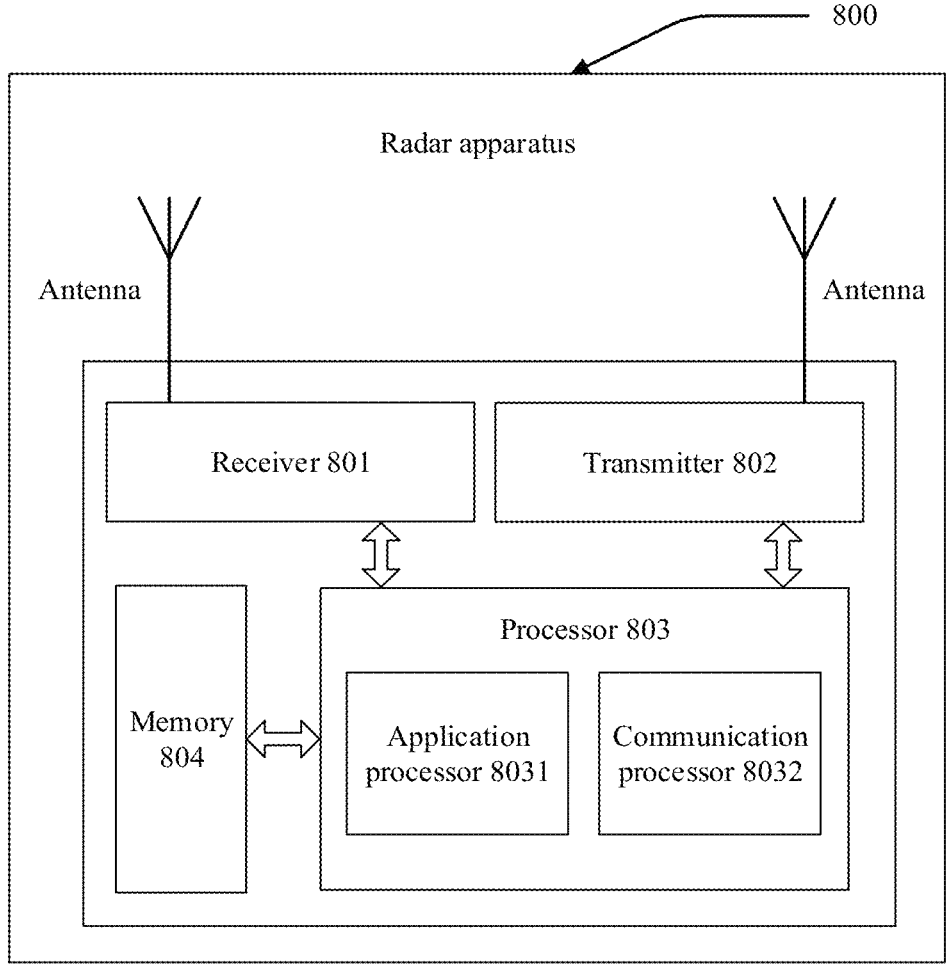
FIG. 8 is a schematic diagram of a structure of a radar apparatus according to an embodiment of this application.

The following describes a radar apparatus provided in an embodiment of this application. FIG. 8 is a schematic diagram of a structure of a radar apparatus according to an embodiment of this application. In some embodiments, the radar apparatus 800 includes a receiver 801, a transmitter 802, a processor 803, and a memory 804 (a quantity of processors 803 in the radar apparatus 800 may be one or more, and one processor is used as an example in FIG. 8), where the processor 803 may include an application processor 8031 and a communication processor 8032. In some embodiments of this application, the receiver 801, the transmitter 802, the processor 803, and the memory 804 may be connected by using a bus or in another manner.

The memory 804 may include a read-only memory and a random access memory, and provide instructions and data to the processor 803. A part of the memory 804 may further include a non-volatile random access memory (NVRAM). The memory 804 stores a processor and operation instructions, executable modules or data structures, or a subset thereof, or an extended set thereof, where operation instructions may include various operation instructions used to implement various operations.

The processor 803 controls an operation of the radar apparatus. In a specific application, components are coupled together by using a bus system. In addition to a data bus, the bus system includes a power bus, a control bus, and a status signal bus. However, for clear description, various types of buses in the figure are marked as the bus system.

The method disclosed in the foregoing embodiment of this application may be applied to the processor 803, or implemented by the processor 803. The processor 803 may be an integrated circuit chip and has a signal processing capability. In an implementation process, the steps in the foregoing method may be implemented by using a hardware integrated logical circuit in the processor 803, or by using instructions in a form of software. The processor 803 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 803 may implement or execute methods, steps and logical block diagrams in the method embodiments of the present invention. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 804, and a processor 803 reads information in the memory 804 and completes the steps in the foregoing methods in combination with hardware of the processor.

The receiver 801 may be configured to receive input digit or character information and generate a signal input related to a setting and function control of the radar apparatus. The transmitter 802 may be configured to output digit or character information by using a first interface. The transmitter 802 may be further configured to send an instruction to a disk group by using the first interface, to modify data in the disk group.

Figure 9:
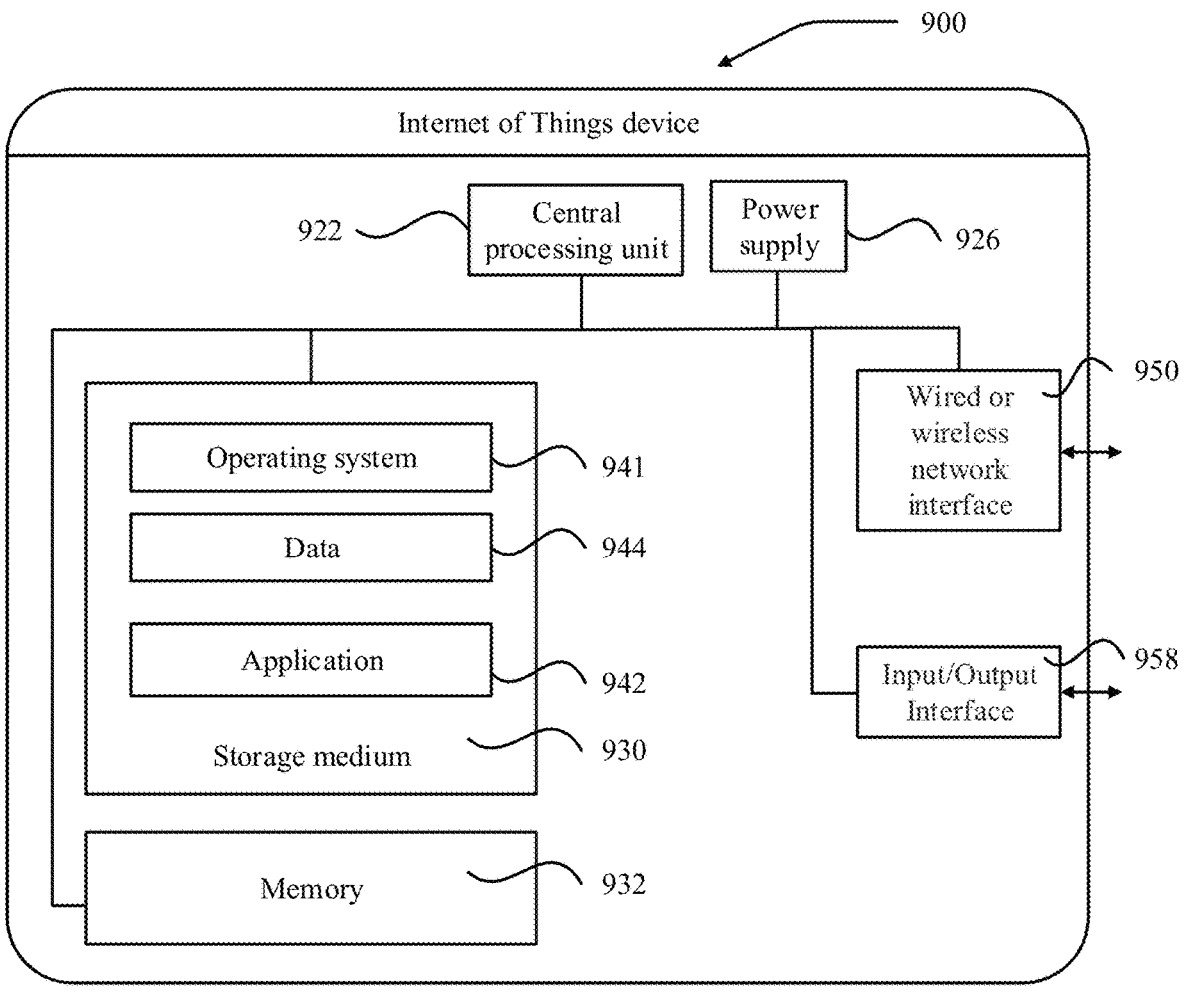
FIG. 9 is a schematic diagram of a structure of an Internet of Things device according to an embodiment of this application.

An embodiment of this application further provides an Internet of Things device. FIG. 9 is a schematic diagram of a structure of an Internet of Things device according to an embodiment of this application. The Internet of Things device may have relatively large differences due to different configurations or performance, and may include one or more central processing units (CPU) 922 (for example, one or more processors) and a memory 932, and one or more storage media 930) (for example, one or more mass storage devices) storing application programs 942 or data 944. The memory 932 and the storage medium 930 may be transitory storage or persistent storage. A program stored in the storage medium 930) may include one or more modules (not shown in the figure), and each module may include a series of instructions for performing operations on a training device. Further, the central processing unit 922 may be configured to communicate with the storage medium 930, and perform operations on the Internet of Things device 900 by using a series of instructions in the storage medium 930.

The Internet of Things device 900 may further include one or more power supplies 926, one or more wired or wireless network interfaces 950, one or more input/output interfaces 958, and/or one or more operating systems 941, such as Windows Server™, Mac OS X™, Unix™, Linux™, and FreeBSD™.

In this embodiment of this application, the central processing unit 922 is configured to perform the gesture recognition method described in the foregoing embodiment and steps related to gesture recognition in the gesture recognition method.

An embodiment of this application further provides a product including a computer program. When the product runs on a computer, the computer is enabled to perform a gesture recognition method.

An embodiment of this application further provides a computer-readable storage medium. The computer-readable storage medium stores a program used to perform signal processing. When the program runs on a computer, the computer is enabled to perform the gesture recognition method in the method described in the foregoing embodiment.

The Internet of Things device provided in the embodiment of this application may be a chip. The chip includes a processing unit and a communications unit. The processing unit may be, for example, a processor. The communications unit may be, for example, an input/output interface, a pin, or a circuit. The processing unit may execute computer-executable instructions stored in a storage unit, so that a chip in an execution device performs the gesture recognition method described in the foregoing embodiment or that a chip in a training device performs the gesture recognition method described in the foregoing embodiment. Optionally, the storage unit is a storage unit in the chip, such as a register or a cache, or the storage unit may be a storage unit located outside the chip in the radio access device, such as a read-only memory (ROM) or another type of static storage device capable of storing static information and instructions, or a random access memory (RAM).

Figure 10:
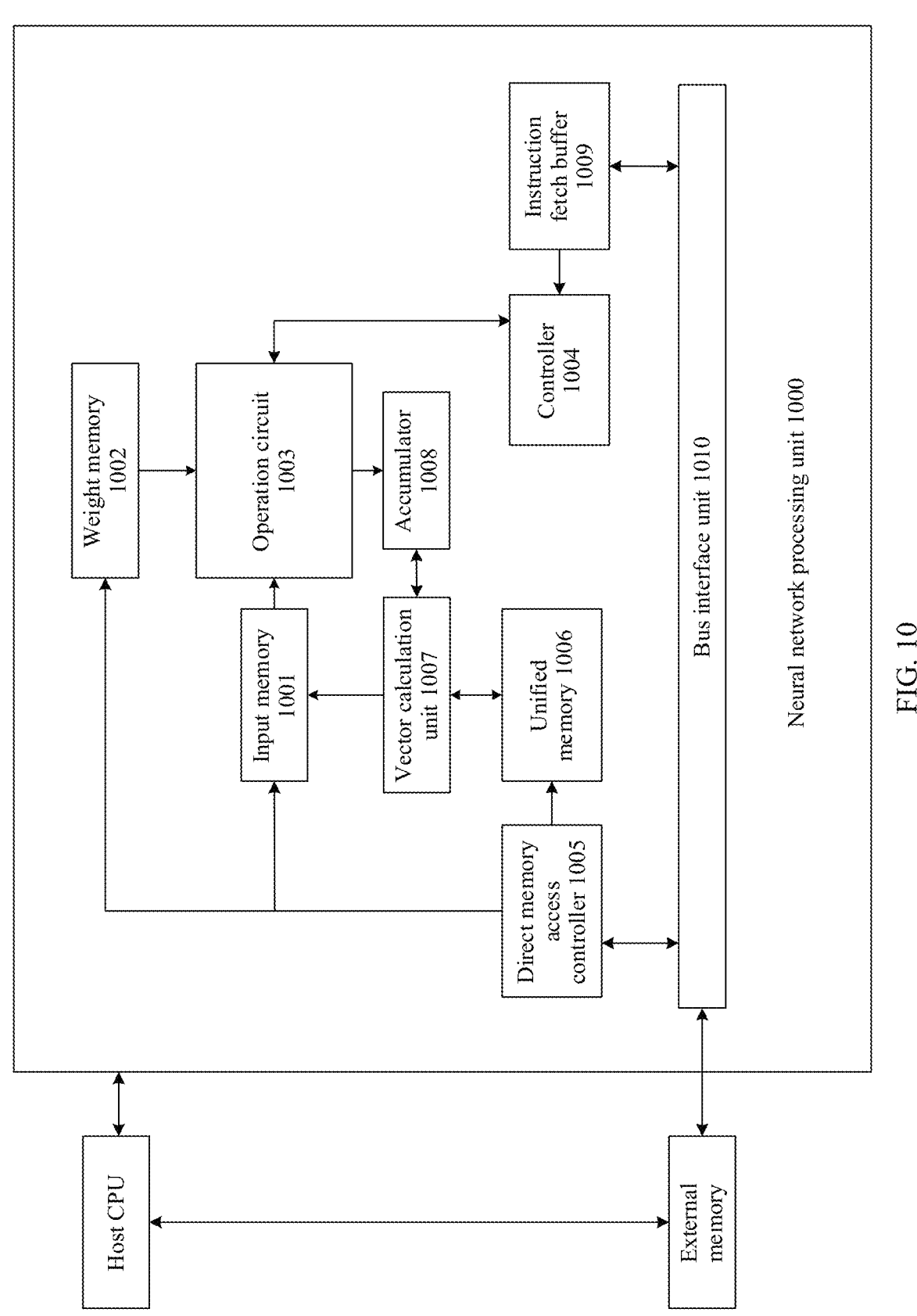
FIG. 10 is a schematic diagram of a structure of a chip according to an embodiment of this application.

In some embodiments, FIG. 10 is a schematic diagram of a structure of a chip according to an embodiment of this application. The chip may be represented as a neural network processor NPU 1000. The NPU 1000 is mounted to a host CPU as a coprocessor, and the host CPU allocates a task. A core part of the NPU is an arithmetic circuit 1003. A controller 1004 may control the arithmetic circuit 1003 to extract matrix data in a memory and perform a multiplication operation.

In some implementations, the arithmetic circuit 1003 includes a plurality of processing units (Process Engine, PE). In some implementations, the arithmetic circuit 1003 is a two-dimensional systolic array. The arithmetic circuit 1003 may alternatively be a one-dimensional systolic array or another electronic circuit capable of performing mathematical operations such as multiplication and addition. In some implementations, the arithmetic circuit 1003 is a general-purpose matrix processor.

For example, it is assumed that there is an input matrix A, a weight matrix B, and an output matrix C. The arithmetic circuit fetches corresponding data of the matrix B from a weight memory 1002, and buffers the data on each PE in the arithmetic circuit. The arithmetic circuit obtains data of the matrix A from an input memory 1001, performs a matrix operation on the data and the matrix B, and stores an obtained partial result or final result of the matrix in an accumulator 1008.

A unified memory 1006 is configured to store input data and output data. Weight data is moved to the weight memory 1002 by using a direct storage unit access controller (direct memory access controller, DMAC) DMAC 1005. Input data is also moved to the unified memory 1006 by using the DMAC.

A BIU is a bus interface unit, that is, a bus interface unit 1010, and is used by an AXI bus to interact with the DMAC and an instruction fetch memory (Instruction Fetch Buffer, IFB) 1009.

The bus interface unit 1010 (BIU) is used by the instruction fetch memory 1009 to obtain an instruction from an external memory, and further used by the storage unit access controller 1005 to obtain original data of the input matrix A or the weight matrix B from the external memory.

The DMAC is mainly configured to move input data in the external memory DDR to the unified memory 1006, move weight data to the weight memory 1002, or move input data to the input memory 1001.

A vector calculation unit 1007 includes a plurality of arithmetic processing units. When necessary, the vector calculation unit 1007 performs further processing on an output of the arithmetic circuit, for example, vector multiplication, vector addition, exponential operation, logarithmic operation, and value comparison. The vector calculation unit 1007 is mainly used for the non-convolutional or fully connected layer network calculation in a neural network, such as batch normalization, pixel-level summation, and upsampling of a feature map.

In some implementations, the vector calculation unit 1007 can store a processed and output vector in the unified memory 1006. For example, the vector calculation unit 1007 may apply a linear function and/or a non-linear function to the output of the arithmetic circuit 1003, for example, perform linear interpolation on a feature map extracted by a convolutional layer, for another example, a vector of an accumulated value, to generate an Activate value. In some implementations, the vector calculation unit 1007 generates a normalized value, a pixel-level summation value, or both. In some implementations, the processed and output vector can be used as an activation input to the arithmetic circuit 1003, for example, for use in subsequent layers in the neural network.

The instruction fetch buffer 1009 connected to the controller 1004 is configured to store an instruction used by the controller 1004.

All of the unified memory 1006, the input memory 1001, the weight memory 1002, and the instruction fetch memory 1009 are on-chip memories. The external memory is private to the NPU hardware architecture.

Any one of the foregoing processors may be a general-purpose central processing unit, a microprocessor, an ASIC, or one or more integrated circuits configured to control execution of a program of the gesture recognition method.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a computer floppy disk, a USB flash drive, a removable hard disk, a ROM, a RAM, a magnetic disk, or an optical disc, and includes several instructions for instructing a computer to perform the methods described in the embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, gesture recognition apparatus, computing device, or data center to another website, computer, gesture recognition apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Drive. SSD), or the like.

It should be understood that "an embodiment" or "an embodiment" mentioned in the whole specification does not mean that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A. and B may be determined according to A. However, it should be understood that determining B based on A does not mean that B is determined based on only A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application.

The foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A gesture recognition method applied to a gesture recognition apparatus, the method comprising:

obtaining an original point cloud data set, wherein the original point cloud data set comprises a plurality of pieces of point cloud data, the plurality of pieces of point cloud data correspond to a plurality of reflected signals, and the plurality of reflected signals correspond to radar signals transmitted by a radar apparatus:

filtering the original point cloud data set to obtain a first point cloud data set, wherein the first point cloud data set comprises a plurality of frames of first point cloud data subsets, wherein each first point cloud data subset comprises a first cluster center, the first cluster center is a cluster center of a plurality of pieces of point cloud data in the first point cloud data subset, wherein a maximum horizontal distance between any two first cluster centers meets a first preset condition, and a duration of the first point cloud data set meets the first preset condition; and performing gesture recognition based on a feature value of point cloud data in the first point cloud data set, including:

normalizing the first point cloud data set based on a quantity of frames in the first point cloud data set being inconsistent with a preset quantity of frames, including:

selecting, based on a time sequence of the first point cloud data set, a union set of point cloud data in a plurality of frames of first point cloud data subsets in the first point cloud data set before normalization, as point cloud data of one first point cloud data subset in the first point cloud data set after normalization, wherein point cloud data in a second frame in the first point cloud data set after normalization is composed of a union set of point cloud data in a fifth frame and point cloud data in a sixth frame in the first point cloud data set before normalization, wherein the second frame is a second one of the first point cloud data subsets after normalization, wherein the fifth frame is a fifth one of the first point cloud data subsets before normalization, wherein the sixth frame is a sixth one of the first point cloud data subsets before normalization, wherein the feature value comprises at least one of a coordinate value, a distance, or a velocity of point cloud data in a spatial coordinate system; and wherein based on a relationship between the quantity of frames in the first point cloud data set before normalization and the preset quantity of frames being not an integer-multiple relationship, odd first point cloud data subsets in the first point cloud data set before normalization are selected as the first point cloud data set after normalization, and a last first point cloud data subset and a penultimate first point cloud data subset in the first point cloud data set before normalization are respectively used as a last first point cloud data subset and a penultimate first point cloud data subset in the first point cloud data set after normalization.

2. The method according to claim 1, wherein the performing the gesture recognition based on the feature value of the point cloud data in the first point cloud data set comprises:

performing clustering processing on the first point cloud data set to generate a second point cloud data set, wherein the second point cloud data set comprises a plurality of frames of second point cloud data subsets, each second point cloud data subset is a subclass with a largest amount of point cloud data after clustering in a corresponding first point cloud data subset, wherein each second point cloud data subset comprises a second cluster center, and wherein a bounding box size of the second cluster center is less than or equal to a bounding box size of the first cluster center; and performing gesture recognition based on a feature value of point cloud data in the second point cloud data set.

3. The method according to claim 2, wherein the normalizing the first point cloud data set is performed before performing the clustering processing on the first point cloud data set to generate the second point cloud data set, wherein the quantity of frames in the first point cloud data set before normalization is expanded or decreased to the preset quantity of frames, wherein a quantity of frames in the first point cloud data set after normalization is the preset quantity of frames, and wherein the preset quantity of frames is determined by a frame rate of the radar signals transmitted by the radar apparatus.

4. The method according to claim 3, wherein the normalizing the first point cloud data set comprises:

selecting, point cloud data of one first point cloud data subset in the first point cloud data set before normalization, as point cloud data of a plurality of frames of first point cloud data subsets in the first point cloud data set after normalization.

5. The method according to claim 4, wherein the performing the gesture recognition based on the feature value of the point cloud data in the second point cloud data set comprises:

determining an average velocity value based on velocities of various point cloud data in the second point cloud data subset, wherein the average velocity value is an average velocity value of various point cloud data in the second point cloud data subset;

filtering out, based on the average velocity value, point cloud data inconsistent with a positive/negative attribute of the average velocity value, in the second point cloud data subset, and determining a third point cloud data subset, wherein velocities of various point cloud data in the third point cloud data subset are consistent with the positive/negative attribute of the average velocity value; and performing gesture recognition based on feature values of point cloud data in a third point cloud data set, wherein the third point cloud data set comprises a plurality of third point cloud data subsets, and wherein a quantity of frames in the third point cloud data set is consistent with a quantity of frames in the second point cloud data set.

6. The method according to claim 5, wherein a velocity of the point cloud data in the first point cloud data set is greater than a first threshold; and a duration between two continuous frames in the first point cloud data set and the first point cloud data subset is less than a second threshold.

7. The method according to claim 4, wherein the feature value of point cloud data in the second point cloud data set undergoes variance processing, median processing, maximum/minimum value processing, or average value processing.

8. The method according to claim 5, wherein normalization is performed on at least one of the feature values of point cloud data in the third point cloud data set.

9. The method according to claim 1, wherein the performing the gesture recognition based on the feature value of the point cloud data in the first point cloud data set comprises:

processing the feature value of the point cloud data in the first point cloud data set by using a neural network model, and performing gesture recognition, wherein the neural network model comprises a recurrent neural network.

10. The method according to claim 1, wherein the performing the gesture recognition based on the feature value of the point cloud data in the first point cloud data set comprises:

performing a similarity calculation based on the feature value of the point cloud data in the first point cloud data set and a preset point cloud data set; and determining, based on a similarity calculation result, a gesture corresponding to the first point cloud data set.

11. The method according to claim 1, wherein the first preset condition is that a maximum horizontal distance between any two first cluster centers is less than a third threshold, and a duration corresponding to the duration of the first point cloud data set is less than a fourth threshold and greater than a fifth threshold.

12. A gesture recognition apparatus comprising:

a memory, coupled to at least one processor and storing programming instructions for execution by the at least one processor; and the at least one processor, configured to execute the programming instructions to facilitate the gesture recognition apparatus to perform the following operations:

obtaining an original point cloud data set, wherein the original point cloud data set includes a plurality of pieces of point cloud data, the plurality of pieces of point cloud data correspond to a plurality of reflected signals, and the plurality of reflected signals correspond to radar signals transmitted by a radar apparatus; and filtering the original point cloud data set to obtain a first point cloud data set, wherein the first point cloud data set comprises a plurality of frames of first point cloud data subsets, wherein each frame of first point cloud data subset corresponds to one frame in the first point cloud data set, wherein the plurality of first point cloud data subsets are continuous in time, and each first point cloud data subset comprises a first cluster center, the first cluster center is a cluster center of a plurality of pieces of point cloud data in the first point cloud data subset, wherein a maximum horizontal distance between any two first cluster centers meets a first preset condition, and a duration of the first point cloud data set meets the first preset condition, and performing gesture recognition based on a feature value of point cloud data in the first point cloud data set, including:

normalizing the first point cloud data set based on a quantity of frames in the first point cloud data set being inconsistent with a preset quantity of frames, including:

selecting, based on a time sequence of the first point cloud data set, a union set of point cloud data in a plurality of frames of first point cloud data subsets in the first point cloud data set before normalization, as point cloud data of one first point cloud data subset in the first point cloud data set after normalization, wherein point cloud data in a second frame in the first point cloud data set after normalization is composed of a union set of point cloud data in a fifth frame and point cloud data in a sixth frame in the first point cloud data set before normalization, wherein the second frame is a second one of the first point cloud data subsets after normalization, wherein the fifth frame is a fifth one of the first point cloud data subsets before normalization, wherein the sixth frame is a sixth one of the first point cloud data subsets before normalization, wherein the feature value comprises at least one of a coordinate value, a distance, or a velocity of point cloud data in a spatial coordinate system; and wherein based on a relationship between the quantity of frames in the first point cloud data set before normalization and the preset quantity of frames being not an integer-multiple relationship, odd first point cloud data subsets in the first point cloud data set before normalization are selected as the first point cloud data set after normalization, and a last first point cloud data subset and a penultimate first point cloud data subset in the first point cloud data set before normalization are respectively used as a last first point cloud data subset and a penultimate first point cloud data subset in the first point cloud data set after normalization.

13. The apparatus according to claim 12, wherein the operations further include:

performing clustering processing on the first point cloud data set to generate a second point cloud data set, wherein the second point cloud data set comprises a plurality of frames of second point cloud data subsets, each second point cloud data subset is a sub-class with a largest amount of point cloud data after clustering in a corresponding first point cloud data subset, wherein each second point cloud data subset comprises a second cluster center, wherein a bounding box size of the second cluster center is less than or equal to a bounding box size of the first cluster center; and performing gesture recognition based on a feature value of point cloud data in the second point cloud data set.

14. The apparatus according to claim 13, wherein the operations further include:

normalizing the first point cloud data set based on a quantity of frames in the first point cloud data set being inconsistent with a preset quantity of frames, wherein the quantity of frames in the first point cloud data set before normalization is expanded or decreased to the preset quantity of frames, wherein a quantity of frames in the first point cloud data set after normalization is the preset quantity of frames, and wherein the preset quantity of frames is determined by a frame rate of the radar signals transmitted by the radar apparatus.

15. The apparatus according to claim 14, wherein the operations further include:

selecting, based on a time sequence of the first point cloud data set, a union set of point cloud data in a plurality of frames of first point cloud data subsets in the first point cloud data set before normalization, as point cloud data of one first point cloud data subset in the first point cloud data set after normalization; or selecting, point cloud data of one first point cloud data subset in the first point cloud data set before normalization, as point cloud data of a plurality of frames of first point cloud data subsets in the first point cloud data set after normalization.

16. The apparatus according to claim 15, wherein the operations further include:

determining an average velocity value based on velocities of various point cloud data in the second point cloud data subset, wherein the average velocity value is an average velocity value of various point cloud data in the second point cloud data subset;

filtering out point cloud data inconsistent with a positive/negative attribute of the average velocity value, in the second point cloud data subset based on the average velocity value, and determining a third point cloud data subset, wherein velocities of various point cloud data in the third point cloud data subset are consistent with the positive/negative attribute of the average velocity value; and performing gesture recognition based on feature values of point cloud data in a third point cloud data set, wherein the third point cloud data set comprises a plurality of third point cloud data subsets, and wherein a quantity of frames in the third point cloud data set is consistent with a quantity of frames in the second point cloud data set.

17. The apparatus according to claim 16, wherein a velocity of the point cloud data in the first point cloud data set is greater than a first threshold, and a duration between two continuous frames of first point cloud data subsets in the first point cloud data set is less than a second threshold.

18. The apparatus according to claim 14, wherein the feature value of point cloud data in the second point cloud data set undergoes variance processing, median processing, maximum/minimum value processing, or average value processing.

19. The apparatus according to claim 16, wherein normalization is performed on at least one of the feature values of point cloud data in the third point cloud data set.

20. A non-transitory computer-readable storage medium comprising computer-executable instructions that are executed by a processor of an apparatus and cause the apparatus to:

obtain an original point cloud data set, wherein the original point cloud data set comprises a plurality of pieces of point cloud data, the plurality of pieces of point cloud data correspond to a plurality of reflected signals, and the plurality of reflected signals correspond to radar signals transmitted by a radar apparatus; and filter the original point cloud data set to obtain a first point cloud data set, wherein the first point cloud data set comprises a plurality of frames of first point cloud data subsets, wherein each first point cloud data subset comprises a first cluster center, the first cluster center is a cluster center of a plurality of pieces of point cloud data in the first point cloud data subset, wherein a maximum horizontal distance between any two first cluster centers meets a first preset condition, and a duration of the first point cloud data set meets the first preset condition; and perform gesture recognition based on a feature value of point cloud data in the first point cloud data set, including:

normalizing the first point cloud data set based on a quantity of frames in the first point cloud data set being inconsistent with a preset quantity of frames, including:

selecting, based on a time sequence of the first point cloud data set, a union set of point cloud data in a plurality of frames of first point cloud data subsets in the first point cloud data set before normalization, as point cloud data of one first point cloud data subset in the first point cloud data set after normalization, wherein point cloud data in a second frame in the first point cloud data set after normalization is composed of a union set of point cloud data in a fifth frame and point cloud data in a sixth frame in the first point cloud data set before normalization, wherein the second frame is a second one of the first point cloud data subsets after normalization, wherein the fifth frame is a fifth one of the first point cloud data subsets before normalization, wherein the sixth frame is a sixth one of the first point cloud data subsets before normalization, wherein the feature value comprises at least one of a coordinate value, a distance, or a velocity of point cloud data in a spatial coordinate system; and wherein based on a relationship between the quantity of frames in the first point cloud data set before normalization and the preset quantity of frames being not an integer-multiple relationship, odd first point cloud data subsets in the first point cloud data set before normalization are selected as the first point cloud data set after normalization, and a last first point cloud data subset and a penultimate first point cloud data subset in the first point cloud data set before normalization are respectively used as a last first point cloud data subset and a penultimate first point cloud data subset in the first point cloud data set after normalization.

\*  \*  \*  \*  \*